United States Patent
Kwon et al.

(10) Patent No.: US 9,237,598 B2
(45) Date of Patent: Jan. 12, 2016

(54) METHOD FOR SELF-CONFIGURING A CELLULAR INFRASTRUCTURE AS DESIRED, AND A DEVICE THEREFOR

(75) Inventors: Yeong Hyeon Kwon, Anyang-si (KR); Min Seok Noh, Anyang-si (KR); Jin Sam Kwak, Anyang-si (KR); Dong Cheol Kim, Anyang-si (KR); Sung Ho Moon, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 13/055,073

(22) PCT Filed: Jul. 22, 2009

(86) PCT No.: PCT/KR2009/004066
§ 371 (c)(1),
(2), (4) Date: Jan. 20, 2011

(87) PCT Pub. No.: WO2010/011084
PCT Pub. Date: Jan. 28, 2010

(65) Prior Publication Data
US 2011/0128916 A1    Jun. 2, 2011

Related U.S. Application Data

(60) Provisional application No. 61/082,835, filed on Jul. 23, 2008, provisional application No. 61/083,945, filed on Jul. 27, 2008.

(30) Foreign Application Priority Data

Dec. 31, 2008   (KR) .......................... 10-2008-0138080
Jan. 15, 2009   (KR) .......................... 10-2009-0003312

(51) Int. Cl.
*H04W 52/02*      (2009.01)
*H04W 84/18*      (2009.01)
(Continued)

(52) U.S. Cl.
CPC .......... *H04W 84/18* (2013.01); *H04W 52/0206* (2013.01); *H04W 4/00* (2013.01); *H04W 52/0229* (2013.01)

(58) Field of Classification Search
CPC . H04W 76/021; H04W 84/045; H04W 24/02; H04W 52/325; H04W 84/18; H04W 52/0206; H04W 52/0229
USPC ................. 370/328, 310, 315, 319, 324, 327; 455/411, 424, 436, 561
See application file for complete search history.

(56) References Cited

U.S. PATENT DOCUMENTS 6,047,189 A *   4/2000  Yun et al. .................... 455/452.2
7,190,683 B2 *  3/2007  Giallorenzi et al. .......... 370/335

(Continued)

OTHER PUBLICATIONS

Sung Ho Choi: "Introduction of Self-Optimization Network (SON)", KRnet 2008, Jun. 24, 2008 (http://www.krnet.or.kr/past/past6.asp?sNum=16).

(Continued)

*Primary Examiner* — Marcus R Smith
*Assistant Examiner* — Peian Lou
(74) *Attorney, Agent, or Firm* — Dentons US LLP

(57) ABSTRACT

The present invention relates to wireless communications system. More specifically, the present invention relates to a method in which a mobile station communicates with any desired node in a wireless communications system. This communications method comprises the steps of: transmitting upwards a first signal for searching for any desired node; receiving from the desired node a second signal indicating that a service can be provided to the mobile station, by way of response to the first signal; and carrying out a procedure for receiving the service from the desired node, wherein the desired node monitors the first signal in a sleep mode.

2 Claims, 16 Drawing Sheets

(51) Int. Cl.

| | |
|---|---|
| *H04W 84/04* | (2009.01) |
| *H04W 4/00* | (2009.01) |
| *H04W 36/00* | (2009.01) |
| *H04W 24/02* | (2009.01) |
| *H04W 24/10* | (2009.01) |
| *H04W 48/10* | (2009.01) |
| *H04W 48/12* | (2009.01) |

(56) References Cited

U.S. PATENT DOCUMENTS

| | | | |
|---|---|---|---|
| 7,385,503 B1 * | 6/2008 | Wells et al. | 340/539.26 |
| 7,457,623 B2 * | 11/2008 | Naghian et al. | 455/439 |
| 7,603,124 B2 * | 10/2009 | Claussen et al. | 455/437 |
| 7,613,444 B2 * | 11/2009 | Lindqvist et al. | 455/403 |
| 2006/0280147 A1 * | 12/2006 | Rizvi et al. | 370/335 |
| 2008/0069020 A1 * | 3/2008 | Richardson | 370/311 |
| 2008/0102794 A1 | 5/2008 | Keevill et al. | |
| 2008/0192766 A1 * | 8/2008 | Ranta-Aho et al. | 370/445 |
| 2008/0267153 A1 * | 10/2008 | Mukherjee et al. | 370/338 |
| 2009/0047955 A1 * | 2/2009 | Frenger et al. | 455/436 |
| 2009/0052395 A1 * | 2/2009 | Bao et al. | 370/331 |
| 2009/0093252 A1 * | 4/2009 | Czaja et al. | 455/436 |
| 2009/0296641 A1 * | 12/2009 | Bienas et al. | 370/329 |
| 2009/0310477 A1 * | 12/2009 | Lee et al. | 370/208 |
| 2009/0316649 A1 * | 12/2009 | Chen | 370/331 |
| 2010/0016022 A1 * | 1/2010 | Liu et al. | 455/561 |
| 2010/0097969 A1 * | 4/2010 | De Kimpe et al. | 370/311 |
| 2011/0076964 A1 * | 3/2011 | Dottling et al. | 455/68 |

OTHER PUBLICATIONS

C802. 16m-07 _282r3, IEEE 802.16 Broadband Wireless Access Working Group, Mar. 17, 2008.

* cited by examiner (a)

(b)

METHOD FOR SELF-CONFIGURING A CELLULAR INFRASTRUCTURE AS DESIRED, AND A DEVICE THEREFOR

This application claims the benefit of priority of U.S. Provisional Application No. 61/082,835 filed on Jul. 23, 2008, U.S. Provisional Application No. 61/083,945 filed on Jul. 27, 2008, Korean Patent Application No. 10-2008-0138080 filed on Dec. 31, 2008, Korean Patent Application No. 10-2009-0003312 filed Jan. 15, 2009 and PCT Application No. PCT/KR2009/004066 filed Jul. 22, 2009, all of which are incorporated by reference in their entirety herein.

TECHNICAL FIELD

The present invention relates to a wireless communication system, and more particularly, to a configuration of an arbitrary network and a method for operating the arbitrary network in a wireless communication system. The present invention also relates to a method for using resources in an irregular cell.

BACKGROUND ART

A future-generation communication network should be able to provide a higher throughput and a faster communication response speed to Mobile Stations (MSs). Although the best service can be provided to MSs in an optimized communication environment, the requirements of every MS cannot be fulfilled. Especially, a big feature of a wireless communication network is that an MS can conduct communication while it is moving. Therefore, much overhead and a robust design are needed. To replace a conventional wired service with a wireless service, the wireless communication system should provide a high-speed communication environment with low cost.

A legacy wireless communication network was designed for fixed Base Stations (BSs) and mobile terminals. When a coverage hole is created in a specific area, most of service providers attempt coverage extension by means of repeaters. However, MSs should always be satisfied with Quality of Service (QoS) that a regular cell such as a macro cell provides and overall frequency reuse is limited by the design of the macro cell. Recently, techniques for improving QoS as well as eliminating a coverage hole by introducing the concept of extension such as a relay and/or femto cell have been proposed.

For full utilization of an entity added to a network, the entity should be able to be self-merged with a legacy commercial network. That is, a femto cell or a relay should identify its surrounding environment and acquire necessary configuration information from an adjacent device or a backbone, without the aid of an installer. Considering the femto cell and the relay are arbitrary nodes (or irregular cells) for which an on/off operation and mobility are ensured in the network, a dynamic operation should be assumed for them and static information of the legacy commercial network should be used as dynamic information. Self-merging of an entity added to a network with a legacy commercial network is called Self-Organized Network (SON).

DISCLOSURE

Technical Problem

In its initial developmental stage, SON was about a network including nodes communicating with neighbor nodes, such as a mesh network. A node that wants to join the network registers to the network by communicating with neighbor nodes.

FIG. 1 illustrates a conventional conceptual model of SON. Referring to FIG. 1, it is assumed that a network includes nodes, Node A, Node B, Node C and Node D and the nodes can freely communicate with one another. A new node that is to join the network communicates with its neighbor node, Node C. Node C may freely communicate with Node A, Node B and Node D and information about the new node is known across the entire network through Node C. The new node may acquire information about the entire network through Node C and may change its configuration information based on the acquired information.

However, because a cellular network operates based on a business model set by a service provider, communication with a neighbor node (e.g. a femto cell, a relay, etc.) is limited in the cellular network. In this context, application of SON to a cellular wireless communication system is under discussion. If an irregular cell, which is capable of freely turning on/off, freely uses resources of a regular cell according to the state of the irregular cell, it may cause interference to signals of the regular cell. In addition, the irregular cell should provide higher QoS to MSs than the regular cell. Accordingly, there exists a need for a method for effectively suppressing interference from an irregular cell capable of freely turning on/off. For this purpose, various techniques such as power control, resource control, and interference mitigation have been considered.

Accordingly, the present invention is directed to a method for self organizing a cellular infrastructure and an apparatus therefor that substantially obviate one or more problems due to limitations and disadvantages of the related art.

An object of the present invention is to provide information needed to configure a self-organized network and a method for operating the self-organized network.

Another object of the present invention is to provide a method for using resources of a regular cell in an irregular cell.

Another object of the present invention is to provide a method for reducing interference that an irregular cell causes to a signal of a regular cell.

Another object of the present invention is to provide a frame structure with high spatial efficiency, which can be used in an irregular cell.

A further object of the present invention is to provide a specific method for processing data received from an irregular cell at an MS.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for communicating with an arbitrary node at an MS in a wireless communication system includes transmitting a first signal for searching for the arbitrary node on an uplink, receiving from the arbitrary node a second signal indicating that a service can be provided to the MS as a response to the first signal, and performing a procedure for receiving a service from the arbitrary node. The arbitrary node monitors the first signal in a sleep mode.

In another aspect of the present invention, a method for communicating with an MS at an arbitrary node in a wireless communication system includes monitoring an uplink signal in a sleep mode, receiving from the MS a first signal for searching for the arbitrary node, transmitting to the MS a second signal indicating that a service can be provided to the MS as a response to the first signal, and performing a procedure for providing a service to the MS.

In another aspect of the present invention, a method for conducting communication at an arbitrary node in a wireless communication system includes monitoring a signal of a neighbor cell in a stand-alone mode, and changing, upon detection of a signal of one or more cells, a configuration of the arbitrary node to avoid collision with the detected cells.

In another aspect of the present invention, a method for conducting communication in an irregular cell in a wireless communication system supporting OFDMA includes spreading data in a time, frequency or time/frequency domain, and transmitting the spread data to an MS using radio resources shared with a regular cell.

In another aspect of the present invention, a method for processing data at an MS in an irregular cell in a wireless communication system supporting OFDMA includes receiving from an irregular cell data spread in a time, frequency or time/frequency domain, using radio resources shared between the irregular cell and a regular cell, and dispreading the received spread data.

In another aspect of the present invention, a method for conducting communication in an irregular cell in a wireless communication system includes being allocated to specific radio resources by a regular cell, the specific radio resources being usable independently for the irregular cell and transmitting and receiving frames of a specific format to and from an MS.

In a further aspect of the present invention, a method for processing data at an MS in a wireless communication system includes receiving a frame of a specific format from an irregular cell in specific radio resources that the irregular cell can use independently and processing the frame using the specific format defined for the frame of the irregular cell.

Advantageous Effects

As is apparent from the embodiments of the present invention, the following effects can be achieved.

Firstly, information needed to configure an SON and a method for operating the SON can be provided.

Secondly, an irregular cell can efficiently use resources of a regular cell.

Thirdly, an irregular cell can effectively reduce interference that it causes to a signal of a regular cell.

Fourthly, a frame structure with a high spatial efficiency can be provided in an irregular cell.

Fifthly, an MS can process data received from an irregular cell in a specific manner.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
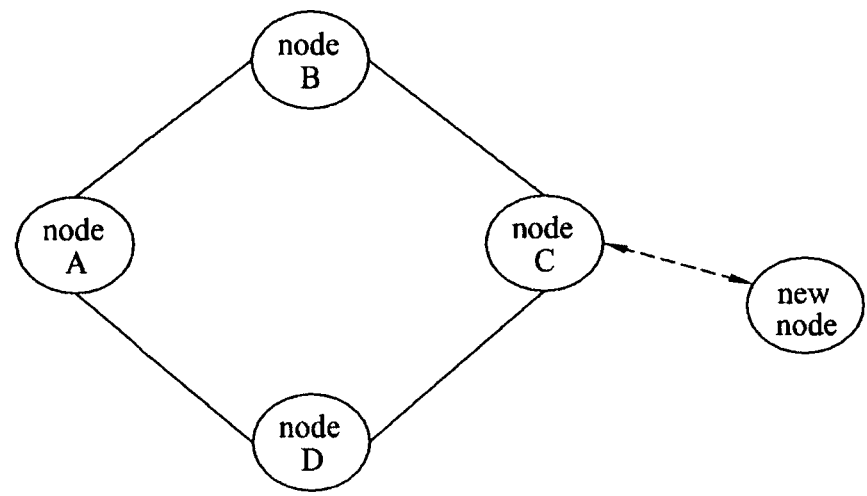
FIG. 1 illustrates a conventional Self-Organization Network (SON) model.

The configuration, operation, and other features of the present invention will readily be understood with embodiments of the present invention described with reference to the attached drawings. Embodiments of the present invention as set forth herein are examples to which the technical features of the present invention are applied.

Terms used herein are defined as follows to help understanding of the present invention. A commercial network supporting a cellular network includes a plurality of regular cells. Here, a regular cell is defined as a network node essential to the commercial network to provide a commercial service, or the service area of the network node. In general, the regular cell is optimized to provide a wider coverage than it can afford to with its capacity. The coverage may be tens of kilometers. For example, a regular cell may provide a service over a wide area covering suburbs, an urban area, a highway, etc. Thus, the regular cell generally uses high power. For instance, a Base Station (BS) transmits a downlink signal with tens of watts of power in a regular cell. In addition, the BS has an antenna fixed high enough to cover buildings in the neighborhood or a local area in order to provide a service in the regular cell. For instance, the antenna of the BS is fixed to a mast installed on the ground or to a roof in the regular cell. The regular cell may be, for example, a macro cell. The terms 'regular cell', 'macro cell', 'regular node', 'regular BS', 'Node B' and 'BS' may be interchangeable with one another.

An irregular cell may be added to the commercial network. Herein, the irregular cell is defined as a network node (an arbitrary node) arbitrarily added to the commercial network or the service area of the arbitrary node. Arbitrary addition of a network node means that the network node may freely be turned on/off or moved, when needed. The irregular cell is optimized more in capacity than in coverage. The irregular cell uses low power. For instance, the irregular cell may transmit a downlink signal with power below 0.1 watt. The irregular cell may function as an access point that enables an MS to access a network of an operator. A BS of the irregular cell may be installed in a building or home, for coverage or any other usage. Therefore, high-speed movement of an MS is limited in the irregular cell. In an environment where fast movement is restricted, users expect a high-speed service and thus a service provider seeks a service based on an Internet backbone. For example, the irregular cell can be connected to a network via an Internet line within a building or home. When being connected to the network via the Internet backbone, the irregular cell may achieve diversity gain by providing an MS with the same service as is provided by a regular cell in which the irregular cell is located, or may provide a service to the MS independently of the regular cell. The irregular cell may be connected wirelessly to the regular cell without being connected to a wired Internet. In the case of wireless connectivity, the irregular cell may be connected to the regular cell in a new frequency band or may maintain inband-connection to the regular cell in a frequency in which the regular cell provides a service.

The term 'irregular cell' covers a relay, a pico cell, and a femto cell. A relay may function only as a repeater, or may regenerate and transmit a signal. Depending on its capability, the relay may relay a service from a BS to an MS or may provide a service to the MS independently. A femto cell is designed to provide a service over a small area such as a home. The femto cell has a service radius of 30 m or below and may independently provide a service to a home, office, etc. A femto cell BS installed in a home is called a Home Node B (HNB). A pico cell is designed to service a larger area such as a company. The pico cell typically covers a radius of 100 m or below and may provide a service to a building independently. The terms 'irregular cell', 'arbitrary cell', 'pico cell', 'femto cell', 'relay', 'irregular node', 'arbitrary node', 'irregular Node B', 'arbitrary Node B', 'arbitrary BS', 'HNB', and 'home BS' are interchangeably used.

Figure 2:
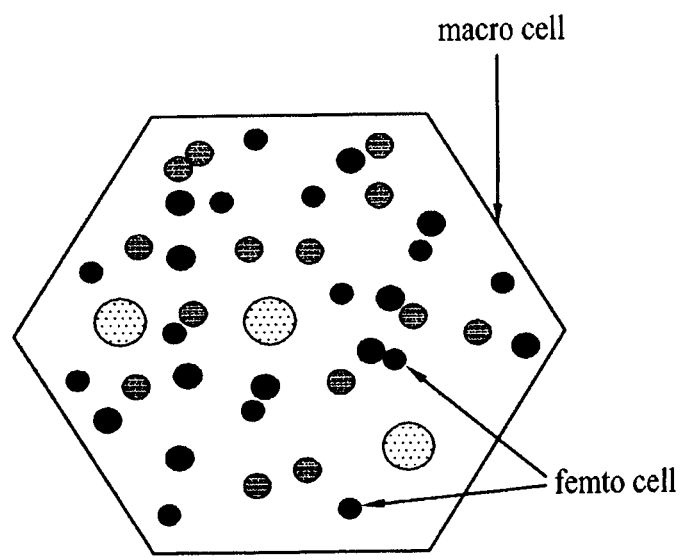
FIG. 2 illustrates a configuration of a macro cell and femto cells, which is applicable to an embodiment of the present invention.

FIG. 2 illustrates a configuration of a macro cell and femto cells, which is applicable to an embodiment of the present invention. Referring to FIG. 2, a plurality of femto cells are distributed within a hexagonal macro cell. The femto cells may be freely turned on/off in any place, when needed. Accordingly, the positions and number of the femto cells are variable. In FIG. 2, the radius of each femto cell represents its coverage. Each femto cell may have a different coverage according to its power. As illustrated in FIG. 2, a plurality of femto cells may be freely turned on/off in any places and conduct communication using radio resources of a macro cell to which they belong. For instance, if a macro cell and a femto cell provide different services, interference may occur at the boundary between the macro cell and the femto cell. Especially when a frequency reuse factor is 1, the interference gets more severe between the macro cell and the femto cell and a handover procedure triggered by movement of an MS may be delayed.

If a cellular network is not SON-enabled, an operator should always be involved in installing and operating a femto cell or a relay. For instance, the operator should configure a downlink signal of a femto cell to be synchronized with a downlink signal of a macro cell, taking into account a propagation delay, such that the femto cell does not affect operations of the macro cell. Further, the operator should assign a different cell ID to the femto cell from a cell ID of the macro cell. The operator should also input configuration information that minimizes interference of the femto cell to MSs communicating with the macro cell. To configure an SON while allowing a femto cell or a relay to interact with an existing network, the followings should be considered.

Firstly, downlink signals should be aligned between a femto cell and a macro cell.

Secondly, the femto cell should have an independent ID distinguishable from an ID of a macro cell or another femto cell/relay. That is, the ID of the femto cell should not collide with the ID of the macro cell or another femto cell/relay.

Thirdly, handover should be readily performed among a macro cell, a femto cell, and a relay.

Fourthly, because the surrounding environment of a femto cell or a relay is dynamically changed, information about cell IDs should not assumed as static information. In addition, it is to be noted that an operation frequency bandwidth may be changed.

Figure 3:
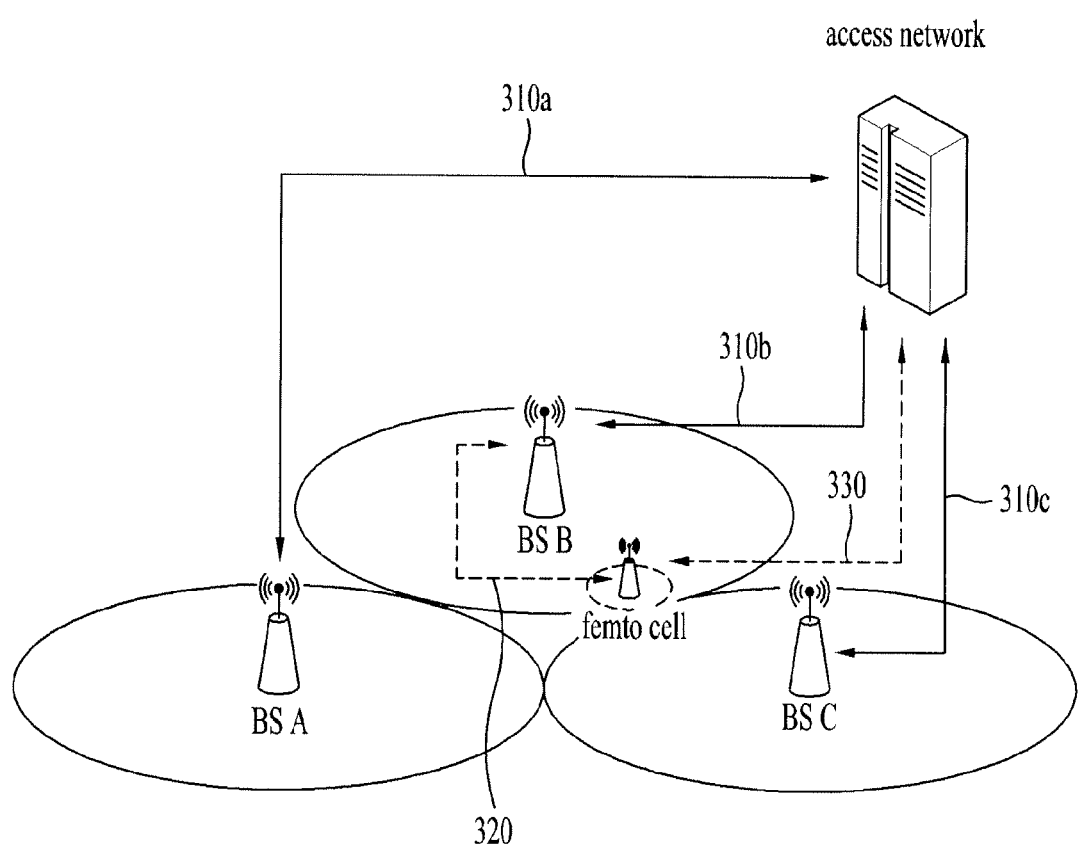
FIG. 3 illustrates an SON model applied to a wireless communication network.

FIG. 3 illustrates an exemplary SON model applied to a wireless communication network.

Referring to FIG. 3, the wireless communication network includes three macro cells and an access network. BSs, BS A, BS B and BS C service the respective macro cells. BS A, BS B and BS C are connected to the access network via a backbone network, as indicated by reference numerals 310a, 310b and 310c. It is assumed that a femto cell is added to the coverage of BS B. To merge in the wireless communication network, the femto cell may set configuration information autonomously by communicating directly with BS B via a radio interface 320. Alternatively, the femto cell may detect its configuration information by communicating with BS B or receiving information from a network controller via the backbone network, as indicated by reference numerals 310b and 330.

3$^{rd}$ Generation Partnership Project (3GPP) Long Term Evolution-Advanced (LTE-ADVANCED) or Institute of Electrical and Electronics Engineers (IEEE) 802.16m is discussing a procedure for applying the SON technology to a cellular network, without presenting a specific solution. Accordingly, the present invention specifies information needed to configure an SON and a method for operating the SON.

Figure 4:
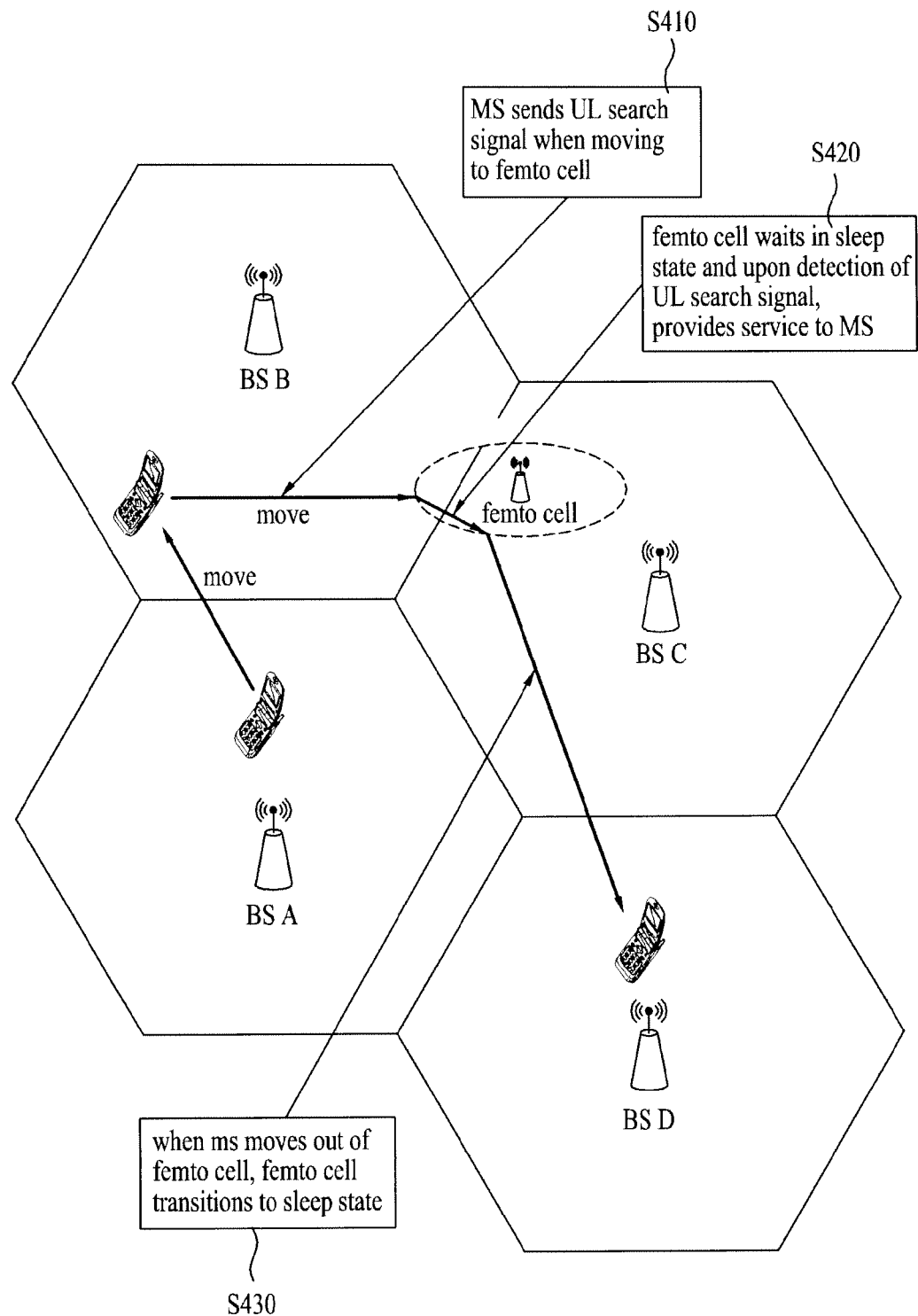
FIG. 4 is a conceptual view illustrating an operation of a femto cell, when the femto cell is added to a wireless communication network according to an embodiment of the present invention.

FIG. 4 is a conceptual view illustrating an operation of a femto cell for communicating with an MS and self-setting configuration information, when the femto cell is added to a wireless communication network according to an embodiment of the present invention.

Referring to FIG. 4, the wireless communication network includes four macro cells and a femto cell. BSs, BS A, BS B, BS C and BS D service the respective macro cells and are connected to an access network via a backbone network. The femto cell may autonomously set its configuration information by acquiring information directly from a BS or an MS via a radio interface. In another example, the femto cell may set its configuration information by acquiring information from the BS or a network controller via the backbone network. A method for setting its configuration information in a femto cell according to the capability of the femto cell will be described later in detail.

In this situation, an MS moves from BS A to BS D through BS B and BS C. During the movement, the MS may want to receive a service from the femto cell, for example, when the MS is aware of the existence of the femto cell. The MS may discover the femto cell based on information acquired from a macro cell. In another example, the MS may be aware of the existence of the femto cell by detecting a specific downlink signal from the femto cell. Meanwhile, the MS may want to receive a service from the femto cell irrespective of the presence of the femto cell.

If the MS wants to receive a service from the femto cell (that is, the MS wants to move to the femto cell), the MS may transmit an uplink signal for requesting a service to the femto cell or searching for the femto cell (S410). The femto cell usually waits in a sleep state without transmitting any downlink signal. That is, the femto cell usually monitors only an uplink signal, without transmitting a downlink signal. Upon detection of a specific uplink signal transmitted by the MS during the uplink signal monitoring, the femto cell performs a procedure for providing a service to the MS (S420). In another example, the femto cell may transmit a downlink signal notifying its presence. In this case, the MS may be aware of the presence of the femto cell by monitoring the downlink signal from the femto cell. Then when the MS moves out of the coverage of the femto cell, the MS performs handover to the macro cell, whereas the femto cell returns to the sleep mode and monitors an uplink signal (S430).

The situation illustrated in FIG. 4 will be detailed, taking into account the capability of the femto cell. For an arbitrary node such as a femto cell or a relay to merge in a commercial network, a network should be configured in a different manner depending on the communication capability and surrounding situation of the node. There also exists a need for specifying an appropriate communication method and a method for setting configuration information for the node, when the node enters the commercial network or moves out of the commercial network. Depending on the capability of the arbitrary node, the following three cases may be considered.

1) Arbitrary Node: Downlink (DL) Transmission (Tx) and Uplink (UL) Reception (Rx)

The arbitrary node has the same communication module as a conventional BS. That is, the arbitrary node only transmits on a DL and only receives on a UL, like a general commercial BS. Therefore, the arbitrary node can transmit signals to and receive signals from only an MS, not to and from a BS. In other words, the arbitrary node can decode and process not a DL signal from the BS but a UL signal from the MS.

In the case where DL and UL frequencies are identical as in a Time Division Duplexer (TDD) system, the arbitrary node may monitor the DL/UL transition of signals. Thus the arbitrary node can achieve signal alignment to some extent with respect to DL traffic of a BS. Yet, the arbitrary node cannot acquire information beyond that level. To acquire more information, two methods are available: using a connected MS and using backbone communication.

According to the former method for autonomously setting configuration information using a connected MS, an MS that has been connected to or is about to be connected to the arbitrary node monitors DL traffic of a neighbor cell. The arbitrary node may identify a surrounding situation and adjust its configuration information, based on the monitoring result of the MS. The monitoring result may include any information related to the arbitrary node's configuration of system information, taking into account the neighbor cell. Alternatively, the monitoring result may contain any information related to close coordination with the neighbor cell. For example, the monitoring result may include information about the signal strength and cell ID of a neighbor BS. In addition, the monitoring result may include broadcast information such as a system BandWidth (BW) and a DL/UL ratio. The monitoring result may further include a superframe number. The arbitrary node may acquire information about the features of the neighbor BS and an available ID through the MS.

According to the latter method for operating without the aid of an MS, a network controller (a central processor) notifies the arbitrary node of configuration information via a backbone network. The arbitrary node may transmit a configuration information request message including information about the arbitrary node to the network controller. The information about the arbitrary node may include information by which the arbitrary node can be identified in the network or information about the capability of the arbitrary node. For example, the information about the arbitrary node may include geographical information and coverage information of the arbitrary node. The configuration information transmitted to the arbitrary node by the network controller may include information about a power level, a cell ID, a system BW, and an indication indicating a control channel configuration.

The arbitrary node performs an operation for externally transmitting and receiving traffic via the backbone network (e.g. a wired communication network such as the Internet) regardless of whether it depends on an MS. When the arbitrary node does not transmit or receive traffic to or from an MS, the arbitrary node may autonomously turn off. In this case, the MS may perform a procedure for discovering the femto cell. That is, typically, the femto cell only monitors a UL signal without transmitting a DL signal as in a power-down or sleep mode. If the MS wants to move to the femto cell, the MS may transmit a UL search signal for searching for the femto cell or a specific UL signal for requesting a service to the femto cell. The specific UL signal may be transmitted in radio resources allocated by a macro cell. Upon detection of the UL signal while monitoring the radio resources, the arbitrary node transmits a response. The UL signal may take the form of a predetermined preamble waveform. The UL signal may also contain specific information needed for handover of the MS to the femto cell. If the UL signal contains the specific information, the information may be transmitted in fixed modulation/coding/diversity/MIMO mode. For facilitating detection of the information, the information is configured with a predetermined combination of a small number of modes, rather than a free combination of modes. The specific information may be processed through blind detection and may be delivered in a signal such as a preamble. If the delivered information is insufficient, the BS may respond to the MS with a DL signal at a position with a predetermined timing offset or frequency offset according to a preset procedure. Although the specific information transmitted to the arbitrary node by the MS may be included in an initiation signal, it may be retransmitted in radio resources allocated, taking into the presence of the femto cell by the macro cell.

Figure 5:
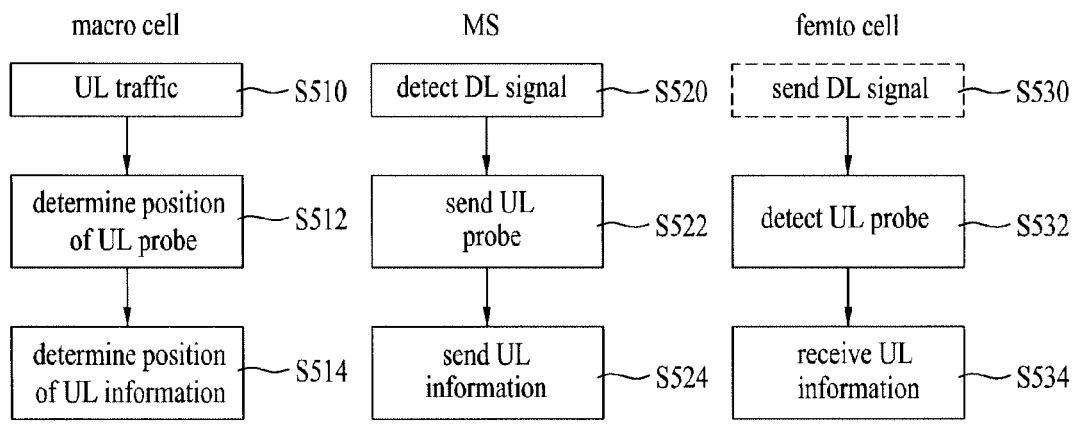
FIG. 5 illustrates a relationship among a macro cell, a Mobile Station (MS), and a femto cell, when the femto cell has only a Downlink Transmission (DL Tx) function and an Uplink Reception (UL Rx) function according to an embodiment of the present invention.

FIG. 5 illustrates a relationship among a macro cell, an MS, and a femto cell, when the femto cell has only a DL Tx function and a UL Rx function according to an embodiment of the present invention. In FIG. 5, a dotted line represents a case in which the MS needs a probe function or information collection. It is assumed that the femto cell is monitoring a UL signal in a sleep mode.

When a signal from the femto cell is not detected as illustrated in FIG. 5, the macro cell takes control of radio resources. Thus the macro cell determines radio resources for signal transmission of the MS. A signal transmission mechanism should be configured such that a UL signal is delivered from the MS to the femto cell and the femto cell is able to transmit a response signal to the MS. The macro cell should be connected to the femto cell via a backbone network, prior to a normal operation of the femto cell. An ID may be selected via the backbone network or received from the MS.

Referring to FIG. 5, the macro cell transmits DL traffic to the MS (S510). The MS monitors a DL signal to search for the femto cell (S520). When needed, the MS may request the macro cell to allocate radio resources for transmitting a UL probe to the femto cell. Upon receipt of the request from the MS, a BS of the macro cell may allocate radio resources to the MS so that the MS can transmit a UL probe (S512). In another example, in the presence of a femto cell within the coverage of the BS of the macro cell, the BS of the macro cell may always allocate specific radio resources for a UL probe. In this case, the BS of the macro cell may notify MSs within the macro cell of the specific radio resources by transmitting broadcast information. Then the MS does not request radio resources for a UL probe to the BS of the macro cell. Upon being allocated to the radio resources for a UL probe, the MS transmits the UL probe in the radio resources (S522). The femto cell usually monitors a UL signal in the sleep mode and detects the UL probe (S532). The femto cell transmits a DL response signal to the UL probe. Upon receipt of the response signal, the MS requests radio resources for UL information transmission to the BS of the macro cell. The macro cell allocates radio resources to the MS so that the MS may transmit UL information in the radio resources to the femto cell (S514). Then the MS transmits the UL information in the allocated resources to the femto cell (S524). The femto cell receives the UL information from the MS (S534).

After being connected to the MS, the femto cell may carry out self-configuration by receiving necessary information from the macro cell through the MS. Some significant system information is required to configure the femto cell. The system information is necessary for the femto cell to serve as a BS and should be received from the macro cell or the network via the backbone. The system information may include at least one of, but is not limited to, a DL/UL ratio, a system operation version (a radio interface version), a system BW, information about multiple carriers, a cell ID available to a femto cell/relay, a neighbor cell ID list, a DL/UL synchronization method, a neighbor femto cell/relay list, a superframe number, information about time/frequency resources available to a femto cell/relay, a femto cell signaling format (timing alignment, an MCS set, a MIMO operation, resource permutation, power control, etc.), MBS scheduling information and data reception information from backbone network, and paging information.

2) Arbitrary Node: DL Tx/Rx and UL Rx

The arbitrary node can transmit and receive a DL signal, but it can only receive a UL signal. That is, the arbitrary node can receive a DL signal from the macro cell and transmit a DL signal to the MS. However, the arbitrary node can receive a UL signal from the MS but cannot transmit a UL signal to the macro cell. In this case, it is reasonable for the arbitrary node to detect its configuration information by decoding a DL signal received from the BS. That is, the arbitrary node may detect information about the macro cell with which the arbitrary node is to associate itself by decoding a DL signal received from the macro cell.

For example, a femto cell may receive candidate IDs in a DL signal, receive DL signals corresponding to the candidate IDs, and compare the received DL signals, to thereby select a cell ID. That is, the femto cell may select a candidate ID for which no signal is detected or the weakest signal is received and may use the selected ID as its cell ID. After receiving the information about the macro cell, the arbitrary node may determine a system BW, a frame number, a superframe number, resource configuration information, sequence use information, etc. In another example, the arbitrary node may acquire the information through the backbone network. For instance, the arbitrary node may detect an ID available to the arbitrary node under the ID of the macro cell and a system BW through the backbone network.

The arbitrary node may autonomously set configuration information using the above information and transmit or receive traffic of the MS through the backbone network. The arbitrary node can receive DL traffic from the BS but cannot transmit a UL signal to the BS. Therefore, the arbitrary node may negotiate with the BS that the arbitrary node receives a DL signal from the BS and transmits a UL signal to the BS through the backbone network or the MS. Usually, the arbitrary node may or may not transmit a DL signal to the MS. Because the arbitrary node should be able to transmit a signal to the BS for negotiation even in the absence of an MS, it is preferred that the negotiation between the arbitrary node and the BS is performed through the backbone network. In addition, the femto cell may notify the MS of its existence, while minimizing interference with the macro cell, by transmitting a DL minimum required signal (e.g. a preamble, basic broadcast information, etc.). On the other hand, if the femto cell does not service an MS, the femto cell may not transmit a DL signal. In this case, an operation of the femto cell may be initiated by an MS.

Figure 6:
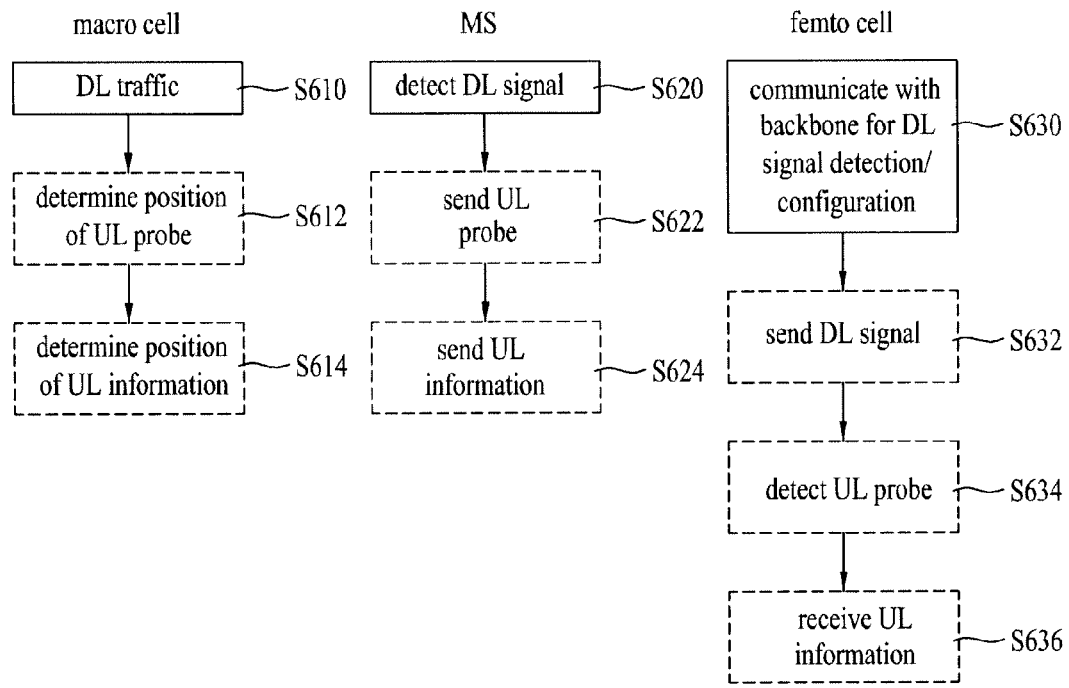
FIG. 6 illustrates a relationship among a macro cell, an MS, and a femto cell, when the femto cell has a DL Tx/Rx function and a UL Rx function according to an embodiment of the present invention.

FIG. 6 illustrates a relationship among a macro cell, an MS, and a femto cell, when the femto cell has a DL Tx/Rx function and a UL Rx function according to an embodiment of the present invention. In FIG. 6, a dotted line represents a case in which the MS needs a probe function or information collection.

Referring to FIG. 6, because the femto cell can receive a DL signal from the macro cell, the femto cell may autonomously set configuration information by receiving a DL signal from the macro cell or through the backbone network (S630). Subsequently, the femto cell monitors a UL signal in a sleep mode. As a signal is not detected from the femto cell, the macro cell takes charge of radio resources and transmits DL traffic to the MS (S610). The MS monitors a DL signal to search for the femto cell (S620). When needed, the MS may request the macro cell to allocate radio resources for transmitting a UL probe to the femto cell. Upon receipt of the request from the MS, the BS of the macro cell may allocate radio resources to the MS so that the MS can transmit a UL probe (S612). In another example, in the presence of the femto cell within the coverage of the BS of the macro cell, the BS of the macro cell may always allocate specific radio resources for a UL probe. In this case, the BS of the macro cell may notify MSs within the macro cell of the specific radio resources by transmitting broadcast information. Then the MS does not request radio resources for a UL probe to the BS of the macro cell. Upon being allocated to the radio resources for a UL probe, the MS transmits the UL probe in the radio resources (S622). The femto cell generally monitors a UL signal in the sleep mode and detects the UL probe transmitted by the MS (S634). Then the femto cell transmits a response signal to the UL probe to the MS. Upon receipt of the response signal, the MS requests radio resources for transmitting UL information to the BS of the macro cell. The macro cell allocates radio resources to the MS, for transmission of UL information to the femto cell (S614) and the MS transmits the UL information in the allocated radio resources to the femto cell (S624). The femto cell receives the UL information from the MS (S636).

3) Arbitrary Node: DL UL/DL and UL Tx/Rx

In the case where the arbitrary node has a Tx/Rx function for a DL and UL, the MS does not play an important role in self-configuration of the arbitrary node.

Figure 7:
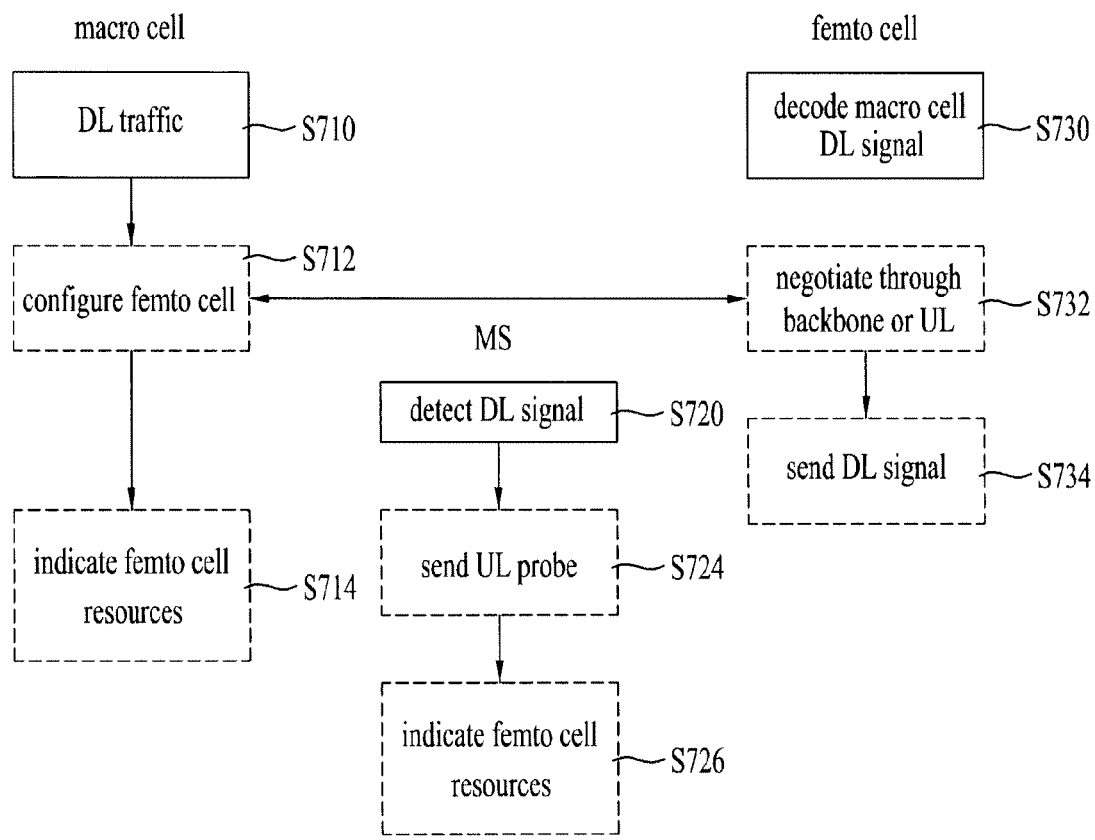
FIG. 7 illustrates a relationship among a macro cell, an MS, and a femto cell, when the femto cell has a DL Tx/Rx function and a UL Tx/Rx function according to an embodiment of the present invention.

FIG. 7 illustrates a relationship among a macro cell, an MS, and a femto cell, when the femto cell has a DL Tx/Rx function and a UL Tx/Rx function according to an embodiment of the present invention. In FIG. 7, a dotted line represents a case in which the MS needs a probe function or information collection.

Referring to FIG. 7, because the arbitrary node is capable of communicating directly with the macro cell, the MS does not need to be involved directly in configuring the arbitrary node. The MS has only to notify the arbitrary node of QoS such as a requested transmission rate and capacity. The arbitrary node collects necessary information by directly decoding a DL signal received from the macro cell (S730). Then the arbitrary node may negotiate with the macro cell by transmitting a query needed to autonomously set configuration information to the macro cell (S712 and S732). The operation of the arbitrary node may be considered in two cases where the arbitrary node is and is not connected to the backbone network. In the case where the arbitrary node is not connected to the backbone network, the arbitrary node transmits all traffic received from the MS to the macro cell via a radio interface. Similarly, the arbitrary node transmits all traffic received from the macro cell to the MS via a radio interface. Thus the arbitrary node operates in a similar manner as a relay. An advantage with the case where the arbitrary node is not connected to the backbone network is to reduce the power consumption of the MS and eliminate a coverage hole from the perspective of service. On the other hand, if the arbitrary node is connected to the backbone, the arbitrary node may provide a wider bandwidth to the MS, thereby reducing power consumption and providing a requested QoS to the MS.

Then the femto cell monitors a UL signal in a sleep mode. As a signal is not detected from the femto cell, the macro cell takes charge of radio resources and transmits DL traffic to the MS (S710). The MS monitors a DL signal to search for the femto cell (S720). When needed, the MS may request the macro cell to allocate radio resources for transmitting a UL probe to the femto cell. Upon receipt of the request from the MS, the BS of the macro cell may allocate radio resources to the MS so that the MS can transmit a UL probe. In another example, in the presence of a femto cell within the coverage of the BS of the macro cell, the BS of the macro cell may always allocate specific radio resources for a UL probe. In this case, the BS of the macro cell may notify MSs within the macro cell of the specific radio resources by transmitting broadcast information. Then the MS does not request radio resources for a UL probe to the BS of the macro cell. Upon being allocated to the radio resources for a UL probe, the MS transmits the UL probe in the radio resources (S722). The femto cell generally monitors a UL signal in the sleep mode and detects the UL probe transmitted by the MS. Then the femto cell transmits a DL response signal to the UL probe. If the MS performs handover to the femto cell, the femto cell may communicate with the MS by sharing radio resources with the macro cell or by using radio resources independently (exclusively) allocated by the macro cell. In the latter case, the femto cell may request necessary radio resources to the macro cell through the MS or the backbone network. Then the macro cell allocates radio resources needed for the femto cell to conduct communication (S714). Information about the radio resources is shared among the macro cell, the femto cell and the MS and the femto cell communicates with the MS in the radio resources (S726).

Figure 8:
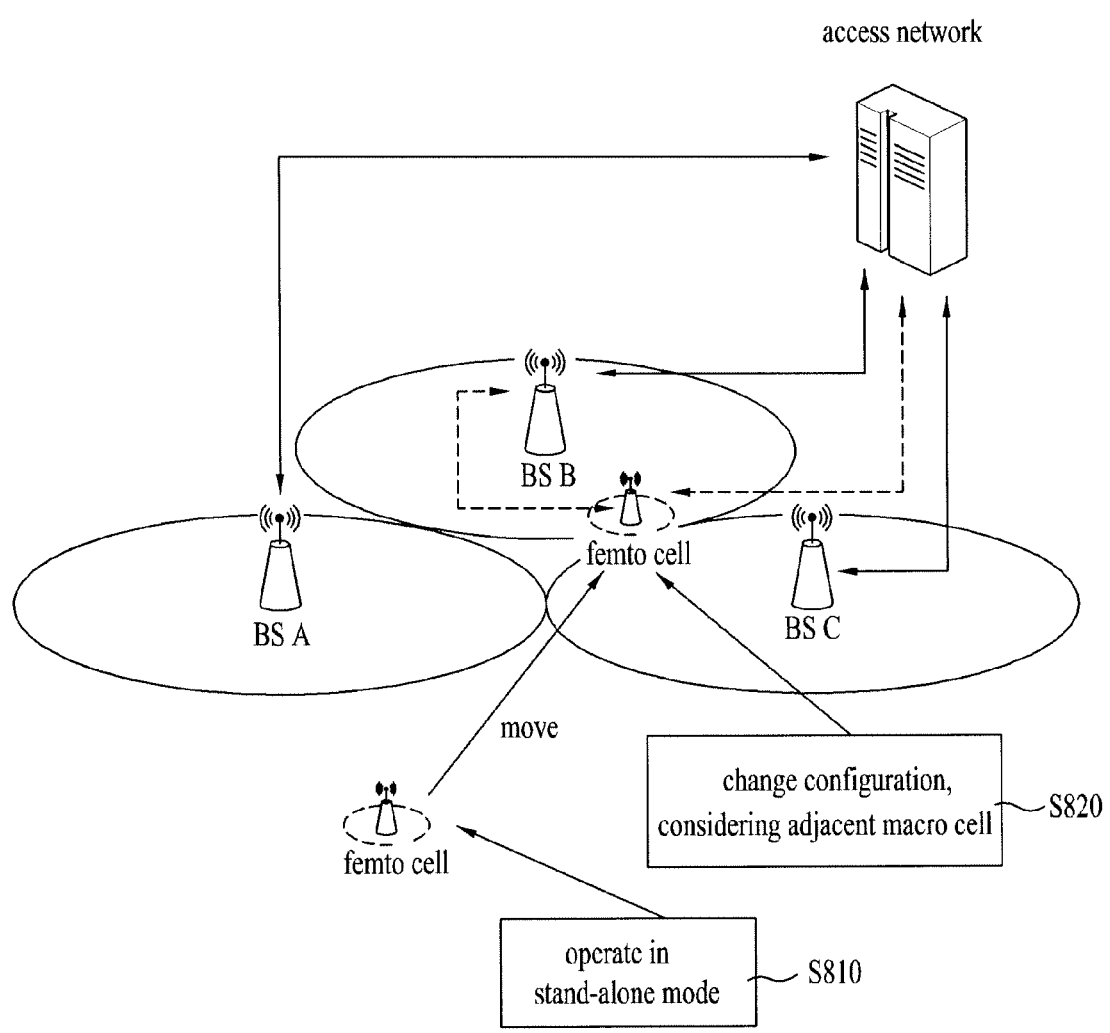
FIG. 8 is a conceptual view illustrating an operation for self-changing configuration information in a femto cell, when the femto cell moves to a wireless communication network according to another embodiment of the present invention.

FIG. 8 is a conceptual view illustrating an operation of a femto cell for self-changing configuration information, when the femto cell moves to a wireless communication network according to another embodiment of the present invention.

Referring to FIG. 8, the wireless communication network includes three macro cells which are serviced by BSs, BS A, BS B and BS C. The BSs, BS A, BS B and BS C are connected to an access network via a backbone network. A femto cell is initially located in a place that is not related to the wireless communication network and thus does not need to conduct communication, taking into account its surrounding environment. That is, in the absence of any signal around the femto cell (i.e. with no relation to the macro cell), the femto cell operates in a stand-alone manner (S810). The stand-alone operation means that the femto cell operates independently without considering a neighbor cell. Therefore, the femto cell can use all available radio resources and freely configure and manage system information related to signal transmission, in the stand-alone mode. Configuration information about the femto cell may be acquired only by communicating with the backbone network, irrespective of the capability of the femto cell.

Then the femto cell moves into the wireless communication network and detects a signal from the macro cell. If the femto cell operates in the stand-alone mode, the femto cell is configured without considering a neighbor cell. Hence, when the stand-alone femto cell detects a signal from the macro cell, collision may occur between the femto cell and the macro cell. To avoid collision, the femto cell adjusts its configuration, taking into the adjacent macro cell (S820). Adjusting the configuration of a femto cell will be described later in great detail.

Figure 9:
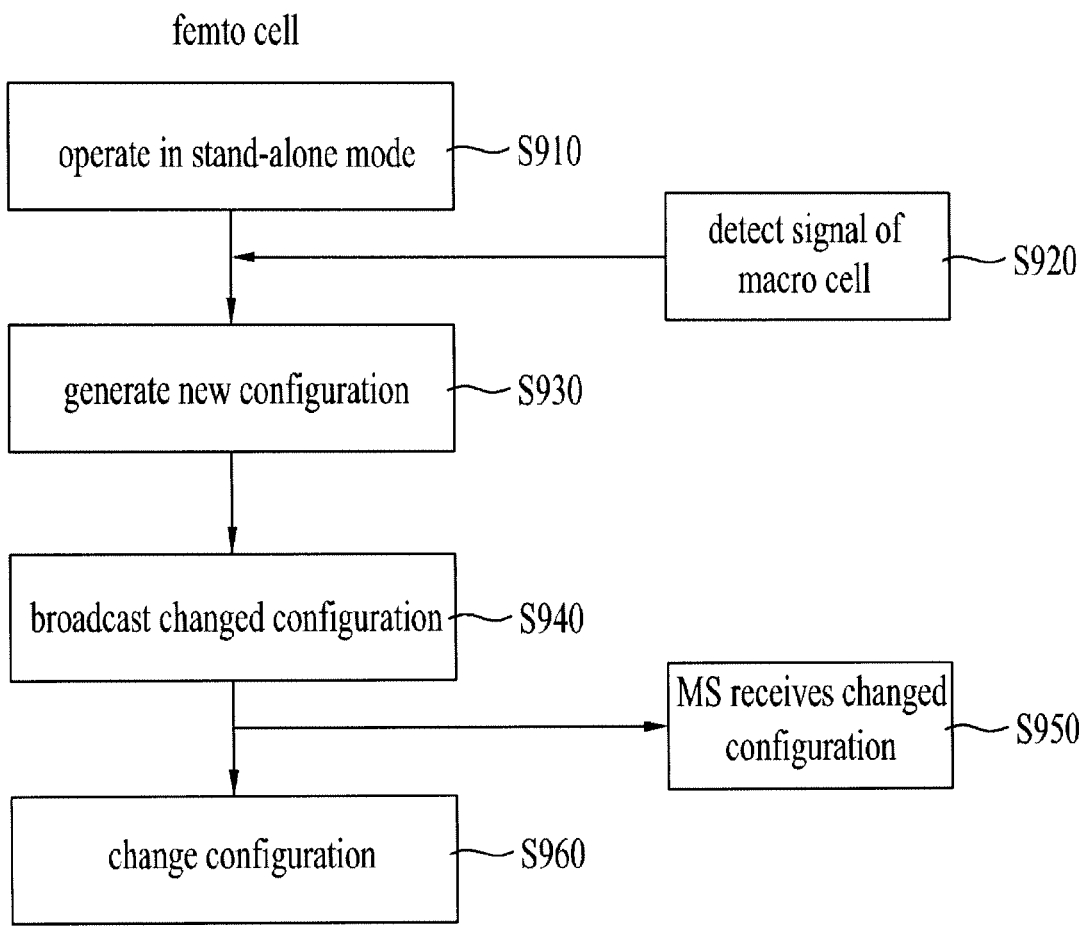
FIG. 9 illustrates an operation for self-changing its configuration in a stand-alone femto cell according to another embodiment of the present invention.

FIG. 9 illustrates an operation of a stand-alone femto cell for autonomously changing its configuration according to another embodiment of the present invention.

Referring to FIG. 9, the femto cell initially operates in the stand-alone mode (S910). Therefore, the femto cell sets its configuration information without considering a neighbor cell. In an embodiment of the present invention, to ensure the stand-alone operation, the femto cell may have default configuration information. In addition, to allow the femto cell to connect to a network via a backbone network, a backbone location to which the femto cell should be connected by default may be preset. While operating in the stand-alone mode, the femto cell attempts to detect a signal from a neighbor cell periodically or upon generation of an event.

Then the femto cell detects a signal from the macro cell (S920). Cases where a femto cell detects a signal from a macro cell are not limited to specific ones. In many cases including movement of a femto cell, a change in the coverage of the femto cell, a new macro cell, etc., the femto cell may detect a signal from a macro cell. The femto cell may detect a signal from the macro cell directly or via an MS. After detecting a signal from the macro cell, the femto cell generates new configuration information to avoid collision with the macro cell (S930). To generate configuration information, taking into account a neighbor cell, the femto cell should be able to change its cell ID dynamically. Further, a resource configuration should be changed in an on-demand fashion. That is, if a macro cell signal is detected and a cell ID collision occurs in a situation where the femto cell freely uses all resources as in the stand-alone mode, the femto cell should analyze its cell ID and rapidly change the cell ID to be compatible with the ID of the macro cell. Besides, the femto cell may change at least one piece of system information needed to operate as a BS. The system information may include a DL/UL ratio, a system operation version (a radio interface version), a system BW, information about multiple carriers, a cell ID available to a femto cell/relay, a neighbor cell ID list, a DL/UL synchronization method, a neighbor femto cell/relay list, a superframe number, information about time/frequency resources available to a femto cell/relay, a femto cell signaling format (timing alignment, an MCS set, a MIMO operation, resource permutation, power control, etc.), and MBS scheduling information, data reception information, and paging information from the backbone.

The femto cell broadcasts the changed system information (S940). After receiving the broadcast information, the MS conducts communication based on the broadcast information (S950). Then the femto cell self-changes its configuration based on the configuration information generated in step S930 (S950). In FIG. 9, the order of steps S940, S950 and S950 and their combination are purely exemplary. Depending on implementation, the steps may be performed in a different order.

Figure 10:
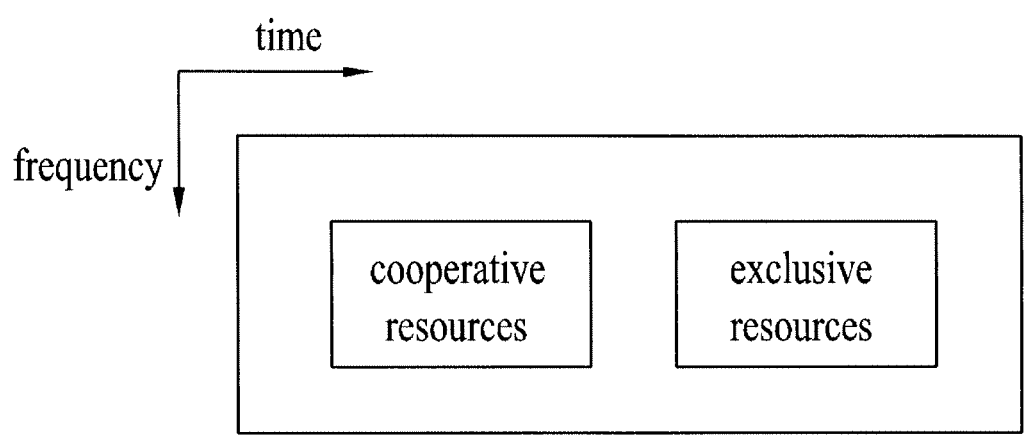
FIG. 10 illustrates an exemplary structure of radio resources used by a relay in a regular cell supporting an Orthogonal Frequency Division Multiple Access (OFDMA) system.

FIG. 10 illustrates the structure of radio resources used by a relay in a regular cell supporting an OFDMA system.

Referring to FIG. 10, the horizontal axis represents time and the vertical axis represents frequency. Specifically, time resources are divided into OFDM symbols and frequency resources are divided into subcarriers. An outer rectangle represents radio resources used by the regular cell. The relay may use radio resources largely in two methods.

In one of the methods, the relay may transmit a signal simultaneously with an MS or a BS. In this case, the relay shares radio resources with a macro cell. The shared radio resources are referred to as cooperative resources. The cooperative resources are advantageous when a signal transmitted from the relay or the MS is compatible with or the same as a signal used in the regular cell. In this case, a signal received at the BS or the MS via the relay may additionally have a diversity gain.

In the other method, the relay uses independent time/frequency resources in which it transmits a signal to the MS. That is, the regular cell is not allowed to use independent radio resources allocated to the relay. The independent radio resources are referred to as exclusive resources. The reason for allocating exclusive radio resources to the relay by the regular cell is to prevent a signal from the relay or the MS from colliding with a signal from the regular cell.

Considering that the method for using resources in a relay is similarly applied to an irregular cell, the irregular cell may prefer exclusive resources to cooperative resources because the irregular cell has a small coverage and uses limited radio resources. However, a sufficient spatial efficiency may not be provided within the total coverage of the regular cell, simply by allocating exclusive resources to the specific irregular cell. In addition, a method for minimizing interference to the regular cell should be provided, when exclusive resources are not available to the irregular cell. Moreover, the existence of a plurality of irregular cells that can turn on/off freely may cause various interferences and thus reduce cell capacity. Accordingly, there exists a need for a method for effectively suppressing interference from an irregular cell. For this purpose, various techniques including power control, resource control, and interference mitigation are required to design an irregular cell.

An embodiment of the present invention provides a resource using method for improving reuse of a total frequency and spatial efficiency, while less affecting an operation of a regular cell such as a macro cell, when a service is provided using an irregular cell such as a femto cell. Radio resources for the femto cell may be distinguished by frequency, time, and a code. Frequency reuse may be enhanced by distinguishing the radio resources of the femto cell by time and frequency. Meanwhile, spatial efficiency may be improved with a frequency reuse factor maintained, by distinguishing the radio resources of the femto cell by a code. In terms of resource utilization, the femto cell may use resources through (1) 'simple resource sharing' or (2) 'exclusive resource usage'. In the simple resource sharing method, the femto cell shares radio resources with the macro cell, while in the exclusive resource usage method, the femto cell uses independent radio resources allocated by the macro cell.

1) 'Simple Resource Sharing' Method

If a femto cell is free to use all radio resources of a macro cell, the femto cell may significantly interfere with the macro cell. As a result, an MS serviced by the macro cell may experience degradation of service quality because of the adjacent femto cell. Especially, a femto cell-specific signal may worsen the interference with the macro cell.

Figure 11A:
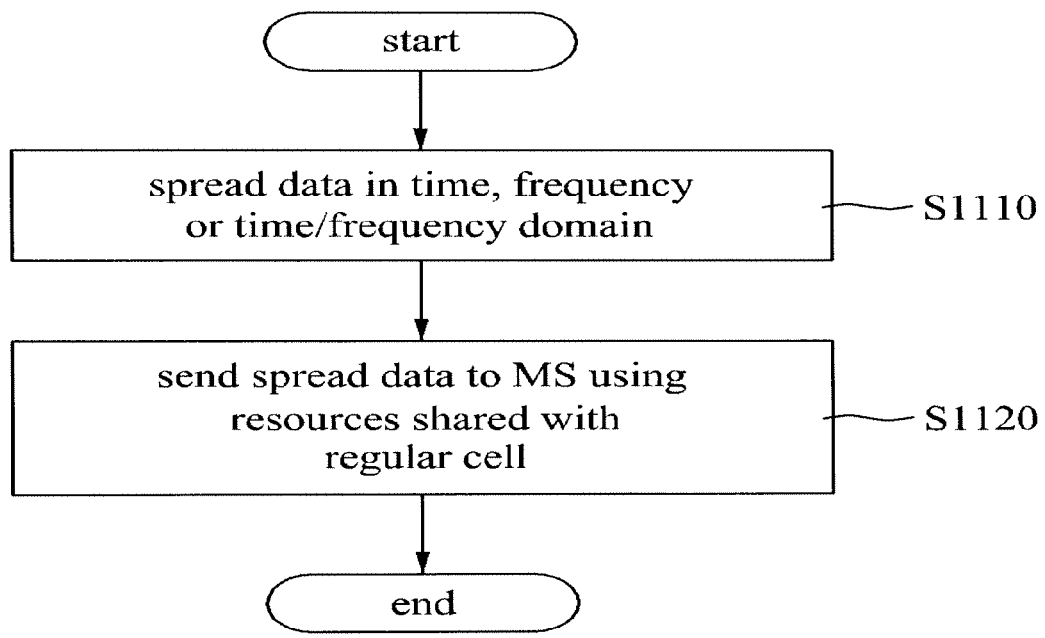
FIG. 11A illustrates an example in which a femto cell transmits DL data by sharing radio resources with a macro cell according to an embodiment of the present invention.

FIG. 11A illustrates an example in which a femto cell transmits DL data by sharing radio resources of a macro cell according to an embodiment of the present invention. Referring to FIG. 11A, the femto cell spreads DL transmission data in the time, frequency or time/frequency domain (S1110). Then the femto cell transmits the spread data to an MS in radio resources shared with a regular cell supporting Frequency Division Multiple Access (FDMA) (S1120). The QoS requirement for a DL signal of a macro cell may be ensured by spreading data in the above manner. For example, the spread data may ensure a sufficiently low Signal-to-Interference Ratio (SIR) for the DL signal of the macro cell. Meanwhile, the radio resources shared with the macro cell are reduced in inverse proportion to the length of the spread data, on the part of the femto cell.

The data spreading may involve applying a spreading sequence (code) to the data. The spreading sequence may be mutually orthogonal to other spreading sequences. Or the spreading sequence may have a low cross correlation even though it is not perfectly orthogonal. For example, the spreading sequence may be a fully orthogonal sequence such as a Zadoff-Chu (ZC) sequence, a Constant Amplitude Zero Auto-Correlation waveform (CAZAC) sequence, a Wash sequence, a Discrete Fourier transform (DFT) sequence, etc. Or the spreading sequence may be a Pseudo Noise (PN) sequence with a small cross-correlation.

A ZC sequence is a kind of CAZAC sequence being an orthogonal sequence. A complex value corresponding to each position k in each ZC sequence u may be expressed as the following equation.

$$d^u(k) = \exp\left\{-j\frac{\pi k(k+1)}{N_{ZC}}\right\} \quad \text{[Equation 1]}$$

where $0 \leq k \leq N_{ZC}-1$ and $N_{ZC}$ is a sequence length.

Regarding the Walsh sequence, for example, Walsh sequences of length 2 may be {1, 1} and {1, −1} and Walsh sequences of length 4 may be {1, 1, 1, 1}, {1, −1, 1, −1}, {1, 1, −1, −1} and {1, −1, −1, 1}. In a similar manner, Walsh sequences of greater lengths may be defined.

If a plurality of femto cells are located within a macro cell, each femto cell may share a spreading sequence within a spreading sequence area with a neighbor femto cell, without using all spreading sequences. That is, different spreading sequences may be set for adjacent femto cells. In other words, different femto cells may be distinguished in Code Division Multiplexing (CDM). Therefore, a spreading sequence or spreading sequence combination used by a femto cell may be used as configuration information about the femto cell. In an embodiment of the present invention, femto cell-specific spreading sequences may be defined to simplify system implementation. A 'femto cell-specific' spreading sequence means that a spreading sequence is applied only to a specific femto cell. For this purpose, a spreading sequence may be predefined for each femto cell, using information that identifies the femto cell from a macro cell or other femto cells, such as a femto cell ID. As femto cell-specific sequences, sequences with a small cross-correlation may be preferred to accommodate femto cells or orthogonal spreading sequences may be preferred to ensure orthogonality between femto cells.

The above-described data spreading of a femto cell prior to transmission aims to reduce interference with a signal of a macro cell. Thus if an interference that non-spread data causes to the macro cell is equal to or less than a threshold, the femto cell may transmit the DL data without spreading the DL data. The threshold may be determined according to a QoS requirement for an MS. Such signals as a preamble signal, a broadcast signal, etc. do not interfere much with the macro cell. Therefore, when the femto cell transmits a preamble signal, a broadcast signal, etc., the femto cell may freely use the radio resources that the macro cell uses for transmitting such signals.

Figure 11B:
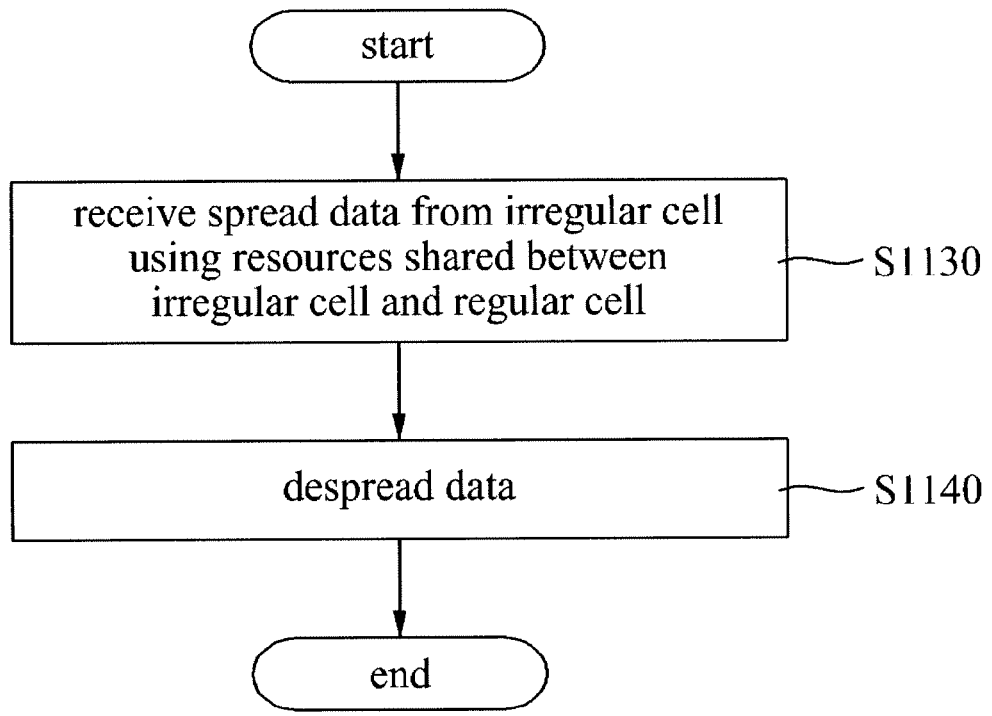
FIG. 11B illustrates a method for processing data at an MS, when a femto cell transmits DL data by sharing radio resources with a macro cell according to an embodiment of the present invention.

FIG. 11B illustrates a method for processing data at an MS, when a femto cell transmits DL data by sharing radio resources with a macro cell according to an embodiment of the present invention.

Referring to FIG. 11B, the MS receives data spread in the time, frequency or time/frequency domain in radio resources shared between the femto cell and the regular cell. The regular cell supports OFDMA (S1130). Then the MS dispreads the received data (S1140). While not shown, the despread data is processed in a general data processing method. As stated before, as the signal transmitted in radio resources shared between the femto cell and the macro cell is despread, a signal of the macro cell gets weak and a signal of the femto cell gets strong. Accordingly, although the femto cell and the macro cell conduct communication by sharing radio resources, it is possible to recover the signal of the femto cell, while minimizing interference from the macro cell. The shared radio resources and data spreading have been described before with reference to FIG. 11A.

Figure 12:
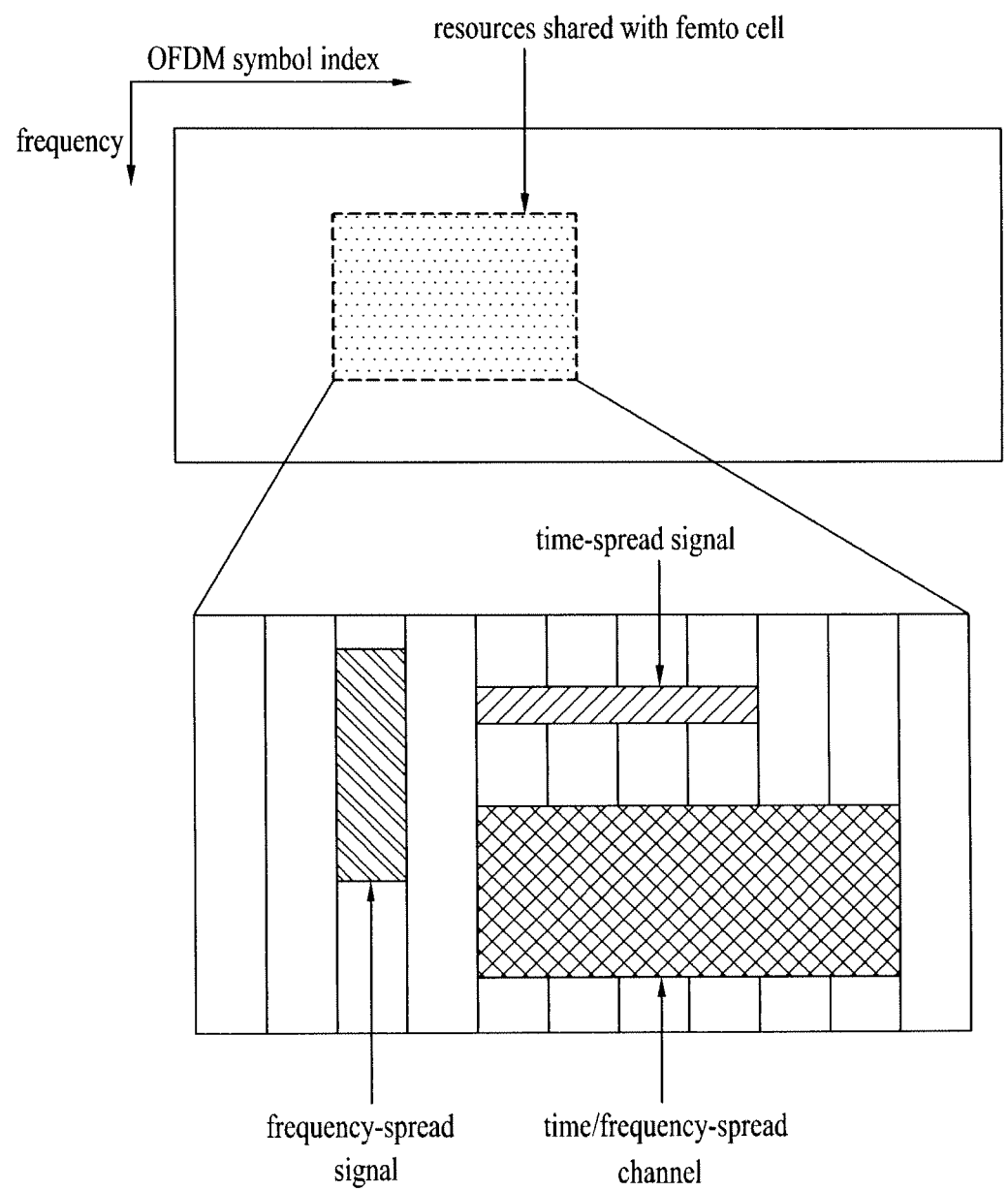
FIGS. 12 and 13 illustrate a method for generating a channel with OFDMA radio resources of a macro cell shared with a femto cell through data spreading according to an embodiment of the present invention.
Figure 13:
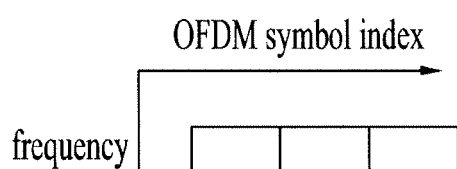
Figure 13:
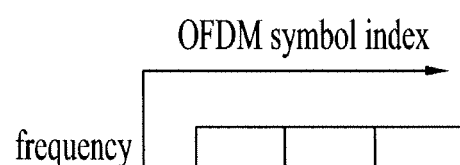

FIGS. 12 and 13 illustrate a method for generating a channel by applying data spreading to OFDMA radio resources of a macro cell, shared with a femto cell according to an embodiment of the present invention.

Referring to FIG. 12, the horizontal axis represents time and the vertical axis represents frequency. Specifically, the time resources are divided into OFDM symbols and the frequency resources are divided into subcarriers. An upper large rectangle represents radio resources of the macro cell. Radio resources shared with the femto cell within the macro cell are marked with a dotted line. The femto cell may generate channels through which it services an MS, using the shared radio resources. As described before with reference to FIG. 11A, a channel is generated by spreading data in the time, frequency or time/frequency domain. If two or more data are spread, these data do not preferably share radio resources in order to reduce interference with the macro cell.

The data spreading involves applying a spreading sequence to the data. In this case, the femto cell may differentiate the length of a spreading sequence for different channels to ensure different QoS levels for the channels, while reducing interference from the macro cell. For example, if an MS is connected to a femto cell, the MS should be able to receive control information successfully from the femto cell. Therefore, a longer spreading sequence may be used, for example, for broadcast information to ensure reliability. On the other hand, a shorter spreading sequence may be applied to traffic, for throughput.

A spreading sequence may be applied in one direction (one-dimensionally) along the frequency axis or the time axis. It is also possible to apply a spreading sequence two-dimensionally using both time and frequency (FIG. 13). A pilot may be spread along the time axis, because a channel does not change fast but channel estimation should be accurate in the femto cell. Due to its small coverage, a delay spread in the femto cell exhibits flat fading channel characteristics such as Additive White Gaussian Noise (AWGN). In this case, it is sufficient to spread pilots to a degree at which an SIR requested by the macro cell can be ensured, in terms of pilot overhead. Meanwhile, if spreading in a specific direction is not preferred, data is spread one-dimensionally along the time or frequency axis and when needed, the data is spread two-dimensionally using another dimension (FIG. 13). For instance, a broadcast channel is spread in a specific direction, for example, along the frequency or time axis. If a sufficient spreading gain is not ensured in this case, control information may further spread using one more dimension.

An advantage of the 'simple resource sharing' method is that an additional signal structure may be used because resources are not limited for a femto cell. That is, much of a conventional frame structure used by a macro cell can be modified. If a conventional macro cell ID is still used, the number of preambles gets important. However, if the femto cell uses an additional preamble structure, the macro cell may be relived of the constraint related to the number of preambles. In the macro cell, a pilot may experience a long delay spread and thus frequency dependent channel estimation should be performed. On the other hand, it may be assumed that a coherence bandwidth is very great in the femto cell. Thus, the femto cell may spread a pilot, while still maintaining the conventional pilot structure. A spreading sequence used for the pilot may be processed blockwise within a correlation bandwidth. For instance, when a total system bandwidth is divided into N subbands, the spreading sequence may be configured so as to spread the pilot in each subband.

If the femto cell and the macro cell simultaneously share resources, the femto cell may transmit a synchronization channel such as a preamble and a basic control channel (e.g. an FCH of IEEE 802.16m) in the same formats as the synchronization channel and the basic control channel of the macro cell. That is, the femto cell may have a configuration that looks like a new cell to initially accessing MSs. However, this may be possible only at positions where legacy resources are not used in a real data transmission and reception mechanism, through time modification. For example, when a femto cell supports a legacy MS in IEEE 802.16m, the femto cell may transmit a preamble, an FCH, and MAP information related to the legacy MS. The femto cell may also transmit a IEEE 802.16m preamble at the same position as an IEEE 802.16m preamble of the macro cell. However, it is preferred that the femto cell transmits data using an OFDM symbol or frequency free of legacy traffic of the macro cell during real DL/UL data transmission. Even in IEEE 802.16m, the femto cell preferably transmits data in an OFDM symbol or frequency free of traffic of the macro cell. This is possible through data transmission on a subframe basis or zone definition. In 3GPP LTE, the femto cell should be able to transmit all synchronization channels and control channels of a cell. Nonetheless, the femto cell may transmit traffic on a resource block basis in an area not used by the macro cell, an area that a scheduler does not schedule on purpose, or an area less affected by antenna beamforming during real traffic transmission. Without this actual aid of the macro cell, the femto cell transmits traffic freely in radio resources of the macro cell. In this case, QoS may be ensured in the femto cell by using a spreading factor. Yet, it is preferred that an important control channel of the femto cell is transmitted to an MS in synchronization with control channels of the macro cell.

2) 'Exclusive Resource Usage' Method

Figure 14A:
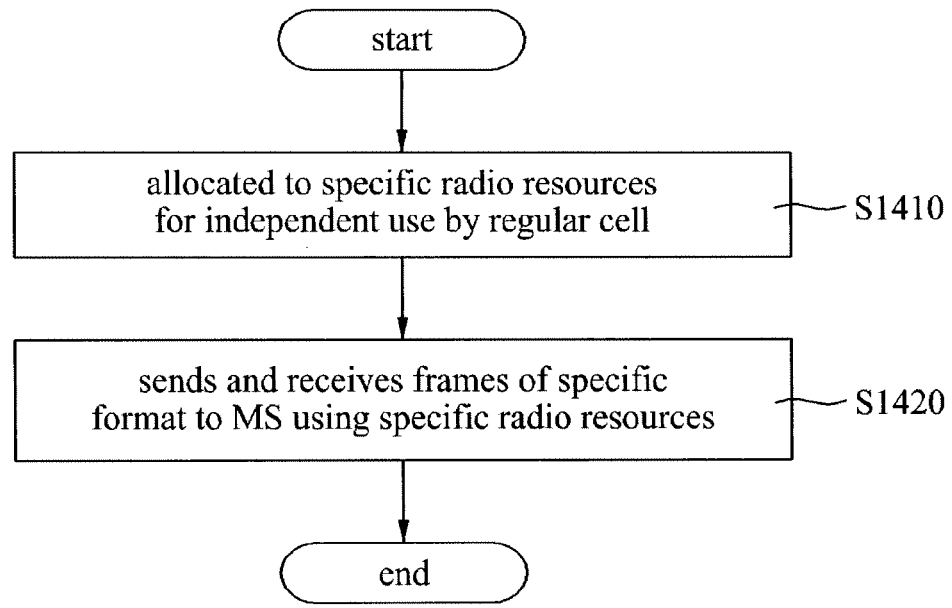
FIG. 14A is a flowchart illustrating an operation for conducting communication independently using radio resources allocated by a macro cell in a femto cell according to an embodiment of the present invention.

FIG. 14A is a flowchart illustrating an operation of a femto cell for conducting communication, independently using radio resources allocated by a macro cell according to an embodiment of the present invention.

Referring to FIG. 14A, an irregular cell is allocated to specific radio resources by a regular cell so that the irregular cell may use the radio resources independently (S1410). That is, the regular cell cannot transmit or receive signals in the specific radio resources. For example, the macro cell may allocate radio resources to a specific femto cell or femto cell group so that the femto cell or femto cell group can use the radio resources freely. The radio resources may be a subcarrier set, an OFDM symbol combination, a code space, or a combination of them. If one or a few femto cells exist within a macro cell, exclusive allocation of specific radio resources to the femto cell(s) may be a waste of radio resources. However, if the number of turned-on femto cell is increased in the macro cell, a higher spatial efficiency can be achieved when each femto cell uses specific radio resources independently. The radio resources may be localized resources or distributed resources that are FDM-multiplexed within one OFDM symbol. In addition, one or more successive OFDM symbols may be allocated along the time axis. However, in case of a TDD operation, distributed OFDM symbols may be more efficient in operation than successive OFDM symbols. Resource allocation along the frequency axis may be affected by a control channel structure used in the femto cell. If a control channel of the femto cell has the same configuration as a control channel of the macro cell, a minimum available band should be allocated to the control channel of the femto cell. For example, if the macro cell uses a system band of 5 MHz and the control channel of the macro cell occupies 5 MHz fully, exclusive resources allocated to the femto cell should also have 5 MHz unless the control channel of the femto cell is otherwise designed. Therefore, when the femto cell operates in the exclusive resources, the control channel of the femto cell may be placed at a different time/position from the control channel of the macro cell. In addition, a basic frame boundary such as a superframe may also be defined differently.

Then the irregular cell may transmit and receive frames of a specific format to and from an MS using the specific radio resources (S1420). For example, if radio resources are defined for free use in the femto cell, the femto cell may define a new frame structure. The term used herein 'frame' is interchangeably used with 'slot', 'subframe', or 'superframe'. The macro cell and the femto cell differ in requirements of service quality, throughput, and design environment. Thus it is insufficient to still apply the frame structure of the macro cell to the femto cell. For this reason, it may be efficient to use a frame structure optimized to the communication environment of the femto cell, if the femto cell has freely usable radio resources. In this case, the frame structure of the femto cell may be designed, taking into account characteristics of the femto cell such as a small coverage, a short channel delay, low power, a high throughput, and flat fading channel characteristics being AWGN characteristics. As a result, the frame structure of the femto cell may be different basically in many aspects from the frame structure of the macro cell. For instance, considering broadcast information is directed to a very small number of users in the femto cell, the remaining control information except for some minimum control information may be transmitted in an on-demand fashion. For example, the femto cell may periodically broadcast only minimum information of a DL signal and a UL control channel. In the presence of a small number of MSs, unused radio resources may be utilized for traffic by transmitting necessary control information upon request of the individual MSs rather than wasting radio resources through continuous broadcasting of control information.

Figure 14B:
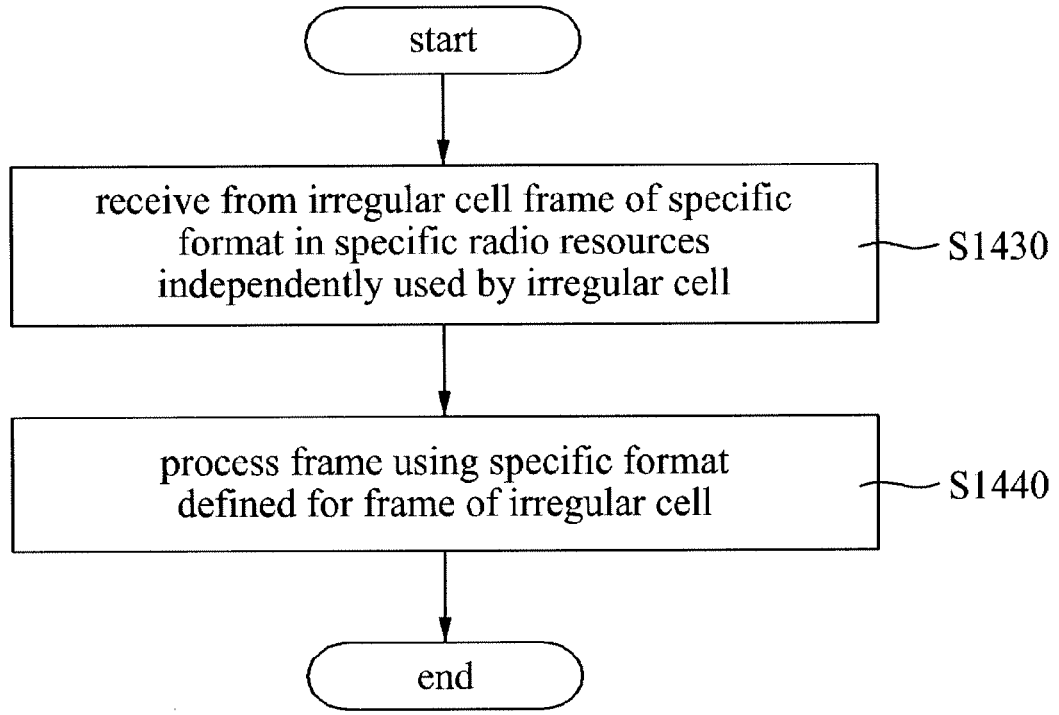
FIG. 14B illustrates a method for processing data at an MS, when a femto cell is independently allocated to radio resources by a macro cell according to an embodiment of the present invention.

FIG. 14B illustrates a method of an MS for processing data, when a femto cell is allocated to independent radio resources by a macro cell according to an embodiment of the present invention.

Referring to FIG. 14B, the MS receives a frame of a specific format in specific radio resources from the irregular cell (S1430). The specific resources can be independently used in the irregular cell. Then the MS processes the frame using the specific format defined for frames of the irregular cell (S1440). A frame having specific radio resources and a specific format has been described before with reference to FIG. 14A.

Figure 15:
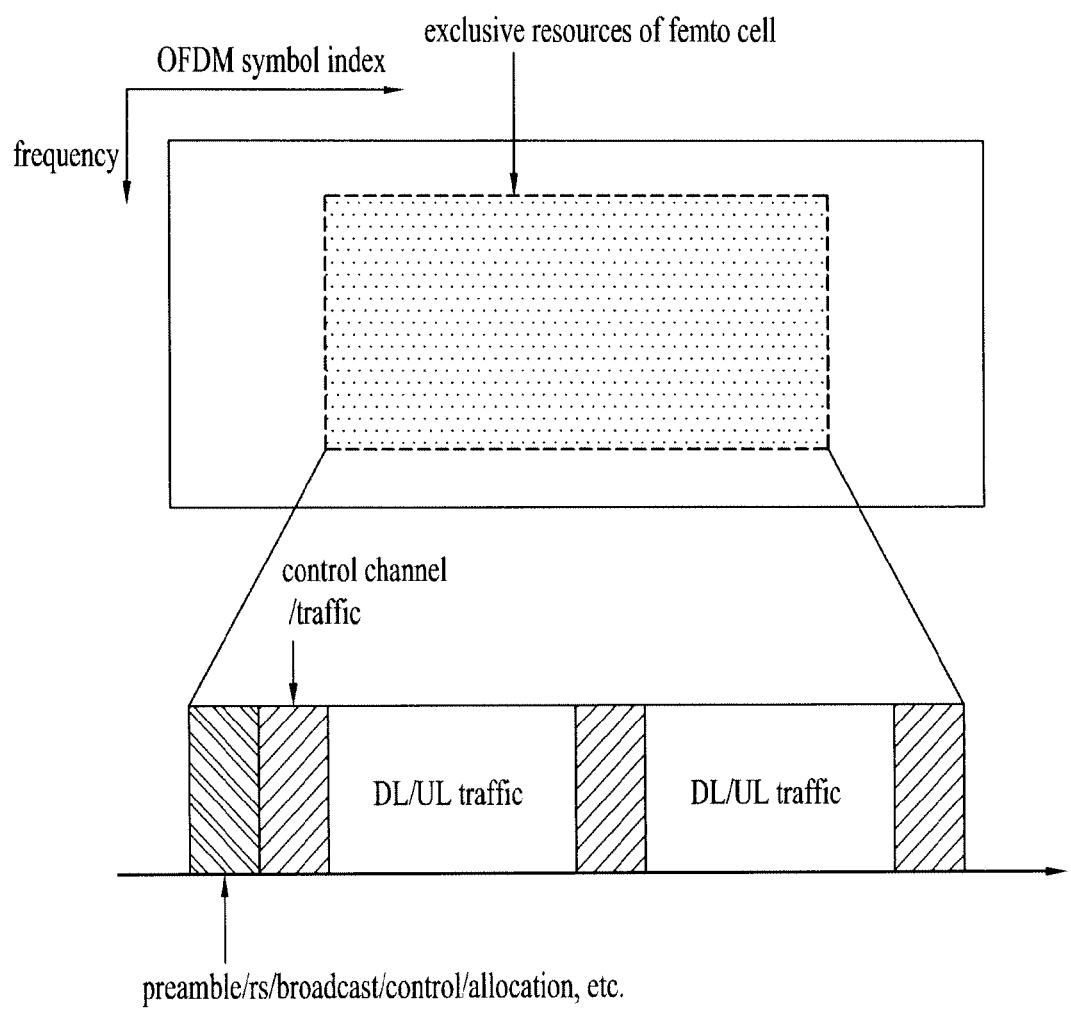
FIG. 15 illustrates a frame structure of a femto cell, which is defined using exclusive radio resources according to an embodiment of the present invention.

FIG. 15 illustrates a frame structure of a femto cell, defined using exclusive radio resources according to an embodiment of the present invention.

Referring to FIG. 15, the frame structure of the femto cell may include at least three areas. A first area may be placed at the start of a frame and has a size determined according to system setting of the femto cell. The first area may include a preamble, a reference signal, broadcast information, minimum control information, resource allocation information, etc. The information of the first area is purely exemplary. Thus new information may be added to the first area or some information of the first area may be included in another area. A second area may follow the first area and may include a control channel and traffic. The size of the control channel in the second area may be changed according to a user request. Accordingly, if the control channel is scaled down in size, the extra area may be used for traffic transmission. That is, the control channel of the second area includes a variable control channel area that can be changed in size in an on-demand fashion. A third area follows the second area, for traffic transmission.

The frame structure of the femto cell may include a preamble distinguishable from a preamble of the regular cell. That is, the femto cell may define a new preamble in the exclusive resources. In this case, the new preamble may have a channel estimation function. Also, DL traffic and UL transmission may be transmitted distinguishably in the femto cell. However, since the output power of the femto cell is more or less similar to the output power of an MS, DL traffic and UL traffic may be transmitted simultaneously depending on circumstances. Control channels may be used more often and that along with data channels. If a preamble is sufficient for channel estimation, the frame structure may not include additional pilot overhead. A plurality of signals may be mixed in one OFDM symbol. For example, an OFDM symbol carrying a preamble signal may also contain another control channel, resource allocation information, or a data traffic signal. A plurality of signals may be multiplexed in one OFDM symbol in Frequency Division Multiplexing (FDM). This is because each control channel does not need high power and simple control channels do not need carry a large amount of information in the femto cell. Therefore, a plurality of small-size channels may be transmitted together in one OFDM symbol rather than transmitted individually. These channels may be joint-coded or separately coded.

When two or more femto cells exist in a macro cell, the femto cells may share exclusive radio resources. Then the femto cells may multiplex their data in the exclusive radio resources. If the femto cells using the same radio resources can cooperate, they may multiplex the radio resources in a manner that maintains orthogonality in the frequency/time domain. That is, if cooperation is possible between the femto cells, the femto cell may multiplex their data in the exclusive radio resources in FDM, TDM or a combination of both. On the contrary, if cooperation is difficult between the femto cells, each of the femto cells may not have information about the other femto cell. In this case, the femto cells sharing the same exclusive radio resources may not multiplex their data in CDM. A code (sequence) used for CDM may be an orthogonal sequence or a sequence having a small cross-correlation. The orthogonal sequence may be a ZC, CAZAC, Walsh, or DFT sequence, and the sequence having a small cross-correlation may be a PN sequence. Preferably, the code/sequence used for CDM is an orthogonal sequence that can perfectly cancels interference between femto cells.

If a femto cell does not have independently usable radio resources, the femto cell should communicate with an MS in an OFDM signal structure of a macro cell. However, if the macro cell allocates an adjacent OFDM symbol as exclusive radio resources to the femto cell, the femto cell may use the OFDM symbol according to a different parameter from that of an OFDM symbol of the macro cell. For instance, the OFDM symbol of the femto cell may have a shorter CP than the OFDM symbol of the macro cell (e.g. 4.69 to 16.67 μs in the 3GPP LTE system). The OFDM symbol of the femto cell may include, but is not limited to, a 0.5- to 2-μs CP. In addition, the femto cell may use a shorter OFDM symbol (e.g. a 32 to 256 FFT size), thereby improving spatial efficiency.

Figure 16:
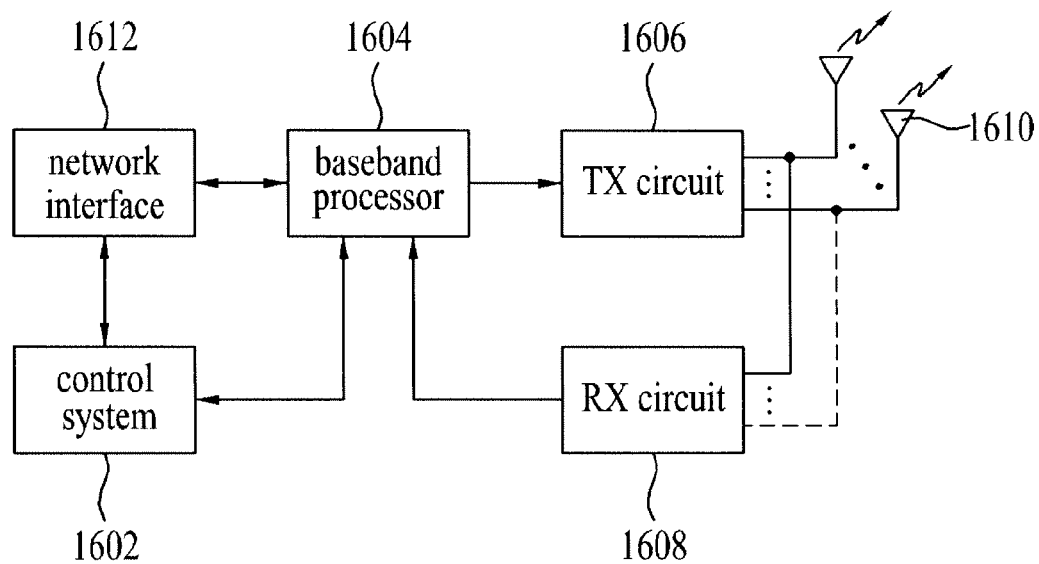
FIG. 16 is a block diagram of a Base Station (BS) applicable to an embodiment of the present invention.

FIG. 16 is a block diagram of a BS applicable to an embodiment of the present invention.

Referring to FIG. 16, the BS includes a control system 1602, a baseband processor 1604, a Tx circuit 1606, an Rx circuit 1608, multiple antennas 1610, and a network interface 1612.

During a reception operation, the Rx circuit 1608 receives a radio signal from an MS through the multiple antennas 1610. Preferably, a low noise amplifier and a filter (not shown) amplify the received signal and removes broadband interference. A downconversion and analog-to-digital conversion circuit (not shown) downconverts the filtered signal to an intermediate frequency or baseband signal and converts the intermediate frequency or baseband signal to one or more digital streams. Then the baseband processor 1604 extracts information or data bits by processing the digital signal. The processing includes demodulation, decoding and error correction. In general, the baseband processor 1604 includes one or more Digital Signal Processors (DSPs). Thereafter, the received information is transmitted to a wireless network or another MS serviced by the BS, via the network interface. The network interface 1612 interacts with a circuit-switched network forming a part of a wireless network that can be connected to a central network controller and a Public Switched Telephone Network (PSTN).

During a transmission operation, the baseband processor 1604 receives digital data representing voice, data or control information from the network interface 1612 under the control of the control system 1602 and encodes the data for transmission. The encoded data is input to the Tx circuit 1606. The Tx circuit 1606 modulates the encoded data with carriers having a desired transmission frequency or frequencies. A power amplifier (not shown) amplifies the modulated carrier signal to a level appropriate for transmission. The amplified signal is provided to the multiple antennas 1610.

Figure 17:
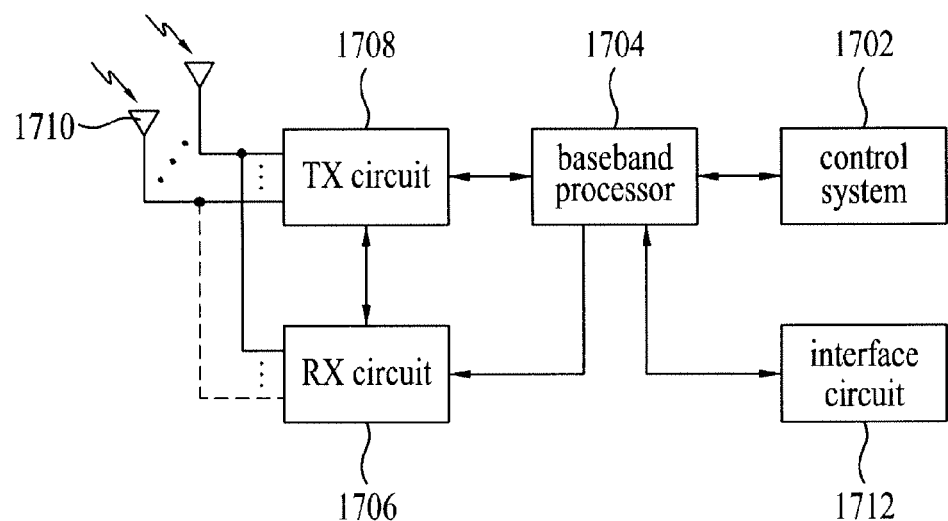
FIG. 17 is a block diagram of an MS applicable to an embodiment of the present invention.

FIG. 17 is a block diagram of an MS applicable to an embodiment of the present invention.

Referring to FIG. 17, the MS includes a control system 1702, a baseband processor 1704, a Tx circuit 1706, an Rx circuit 1708, multiple antennas 1710, and a user interface circuit 1712.

During a reception operation, the Rx circuit 1708 receives a radio signal from one or more BSs through the multiple antennas 1710. Preferably, a low noise amplifier and a filter (not shown) amplify the received signal and removes broadband interference. A downconversion and analog-to-digital conversion circuit (not shown) downconverts the filtered signal to an intermediate frequency or baseband signal and converts the intermediate frequency or baseband signal to one or more digital streams. Then the baseband processor 1704 extracts information or data bits by processing the digital signal. The processing includes demodulation, decoding and error correction. In general, the baseband processor 1704 includes one or more DSPs and Application Specific Integrated Circuits (ASICs).

During a transmission operation, the baseband processor 1704 receives digital data representing voice, data or control information from the user interface circuit 1712 under the control of the control system 1702 and encodes the data for transmission. The encoded data is input to the Tx circuit 1706. The Tx circuit 1706 modulates the encoded data with carriers having a desired transmission frequency or frequencies. A power amplifier (not shown) amplifies the modulated carrier signal to a level appropriate for transmission. The amplified signal is provided to the multiple antennas 1710.

Figure 18:
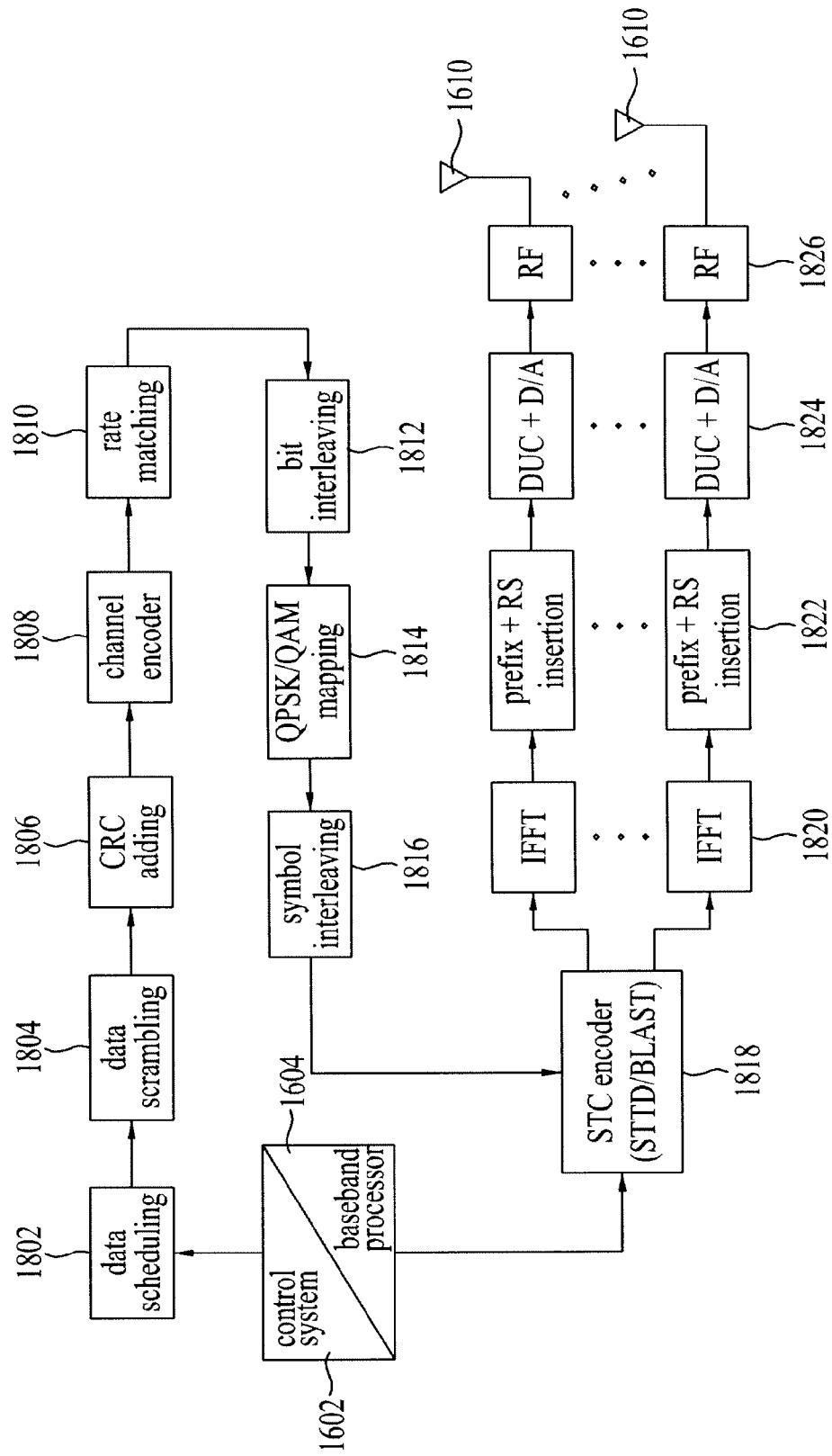
FIG. 18 is a block diagram of a transmitter applicable to an embodiment of the present invention.

FIG. 18 is a block diagram of a transmitter applicable to an embodiment of the present invention.

Referring to FIG. 18, while a transmitter structure is described in the context of a BS, it will be clearly understood to those skilled in the art that the illustrated structure can be used for UL and DL transmission. In addition, a transmission structure is intended to but not limited to represent various multiple access structures including CDMA, FDMA, TDMA, and OFDM.

A network initially transmits data directed to an MS to a BS. A data scrambling module 1804 scrambles scheduled data being a bit stream in a manner that reduces a peak-to-average power ratio related to the data. A Cyclic Redundancy Check (CRC) addition module 1806 determines a CRC for the scrambled data and adds the CRC to the scrambled data. To facilitate data recovery and error correction at the MS, a channel encoder module 1808 performs channel coding on the CRC-attached data. The channel coding effectively adds redundancy to the data. The channel encoder module 1808 may use turbo coding.

A mapping module 1814 systematically maps the processed data bits to symbols in a selected baseband modulation scheme. The modulation scheme may be Quadrature Amplitude Modulation (QAM) or Quadrature Phase Shift Keying (QPSK). The bit group is mapped to symbols corresponding to positions on an amplitude and phase constellation. Then a Space Time Code (STC) encoder module 1018 processes symbol blocks. The STC encoder module 1818 processes symbols in a selected STC encoding mode and provides as many outputs as the number of the multiple Tx antennas 1610, that is, N outputs. An Inverse Fast Fourier Transform (IFFT) processing module 1820 IFFT-processes the symbol stream received from the STC encoder module 1818. A prefix and Reference Signal (RS) addition module 1822 adds a Cyclic Prefix (CP) and an RS to the IFFT signal. Then a Digital UpConversion (DUC) and Digital-to-Analog (D/A) conversion module 1824 upconverts the processed signal to an intermediate frequency signal and converts the digital intermediate frequency signal to an analog signal. Then the analog signal is simultaneously modulated, amplified, and transmitted in a desired RF frequency through a Radio Frequency (RF) module 1826 and the multiple antennas 1610.

Figure 19:
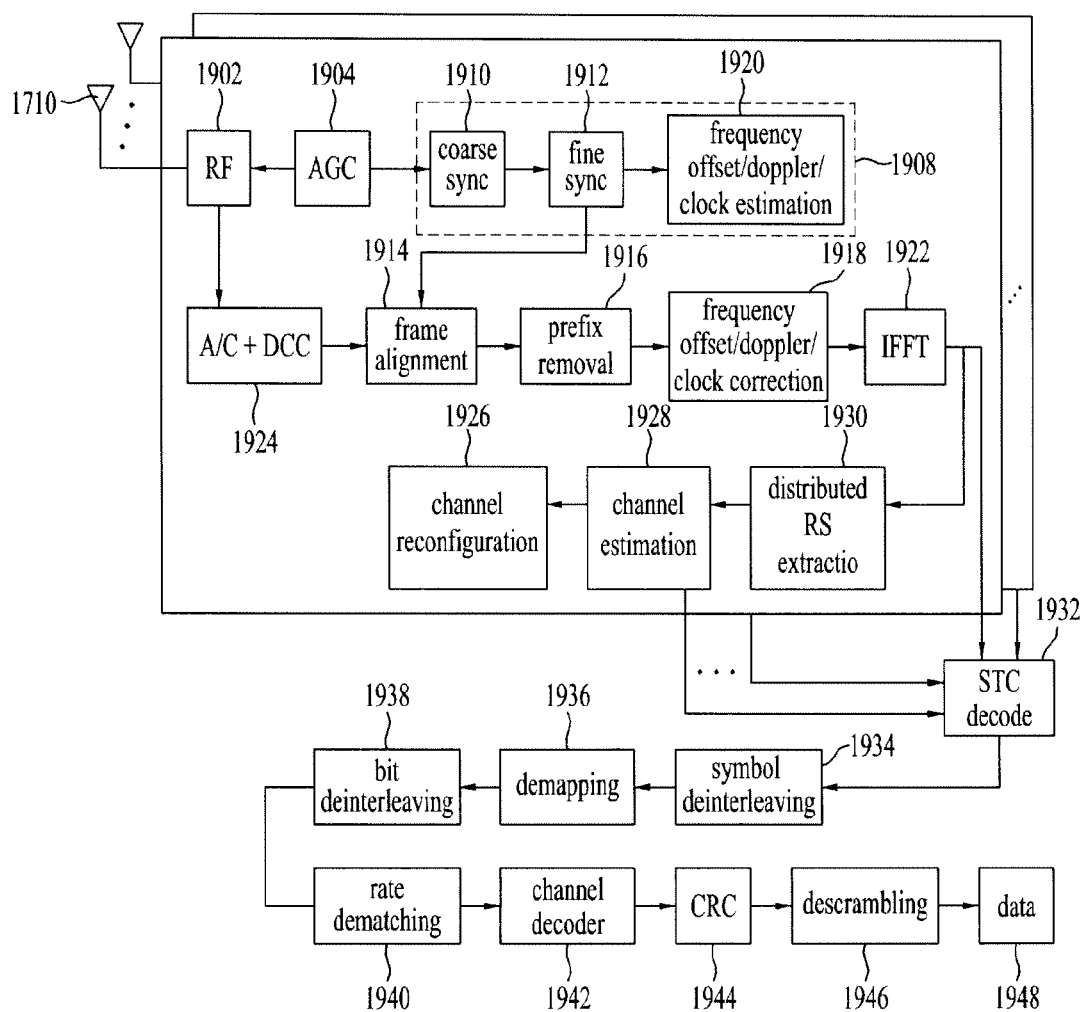
FIG. 19 is a block diagram of a receiver applicable to an embodiment of the present invention.

FIG. 19 is a block diagram of a receiver applicable to an embodiment of the present invention.

Referring to FIG. 19, while a receiver structure is described in the context of an MS, it will be clearly understood to those skilled in the art that the illustrated structure can be used for UL and DL transmission. Upon arrival of transmission signals at the multiple Tx antennas 1710, each of the transmission signals is demodulated and amplified in an RF module 1902. For the sake of convenience, only one of reception paths in the receiver is shown in FIG. 19. An A/D conversion and a Digital DownConversion (DCC) module 1904 converts an analog signal to a digital signal and downconverts the digital signal. An Automatic Gain Controller (AGC) 1906 may use the digital signal in order to control an amplifier gain based on the level of the received signal at the RF module 1902.

The digital signal is provided to a synchronization module 1908. The synchronization module 1908 may include a coarse sync module 1910, a fine sync module 1912, and a module 1920 for estimating a frequency offset or a Doppler effect. The output of the synchronization module 1908 is provided to a frame alignment module 1914 and a frequency offset/Doppler compensation module 1918. A prefix removing module 1916 removes a CP from an aligned frame. An FFT module 1922 FFT-processes the CP-removed data. An RS extraction module 1930 extracts an RS distributed across the frame and provides the RS to a channel estimation module 1928. Then a channel reconfiguration module 1926 reconfigures a radio channel based on a channel estimation result. The channel estimation provides channel response information enough to decode symbols at an STC decoder 1932 according to an STC coding scheme used by the BS and recover transmitted bits. Symbols of the received signal and the channel estimation result of each reception path are provided to the STC decoder 1932. The STC decoder 1932 performs STC decoding on each reception path to recover transmitted symbols. The STC decoder 1932 may implement Maximum Likelihood Decoding (MLD) for BLAST-based transmission. The output of the STC decoder 1932 may be a Log Likelihood Ratio (LLR) for each transmission bit. A symbol deinterleaver module 1934 may deinterleave the STC-decoded symbols to an original order. Then a demapping module 1936 and a bit deinterleaver module 1938 demap and then deinterleave the bit stream. A bit stream processed by a rate dematching module 1940 is provided to a channel decoder module 1942 in order to recover scrambled data and a CRC checksum. A channel decoder module 1942 may use turbo decoding. A CRC module 1944 removes the CRC checksum in a conventional manner and checks the scrambled data. Then the CRC-checked data is recovered to original data 1948 at a descrambling module 1946.

According to the above-described embodiment of the present invention, the throughput of a cell boundary can be increased despite a frequency reuse factor of 1. In addition, interference from a neighbor cell can be actively overcome through aggregation. An MCS table structure supporting a frequency reuse factor of 1 can be provided. Further, the overhead of transmitting information on a control channel to apply aggregation can be reduced.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

The present invention is applicable to a wireless communication system and more particularly, to a configuration of an arbitrary network and a method for operating the arbitrary network in a wireless communication system. The present is also applicable to a method for using resources in an irregular cell.

What is claimed is:

1. A method for dynamically changing a system configuration of a femto cell in a wireless communication system, the method comprising:
   monitoring, by the femto cell, downlink (DL) signals from one or more neighbor macro cells to detect the DL signals and cell IDs (identifiers) of the one or more neighbor macro cells included in respective DL signals in a stand-alone mode where the femto cell uses all available radio resources and operates independently without considering neighbor cells;
   changing, by the femto cell, using a result of detection of the DL signals and the cell IDs of the one or more neighbor macro cells, a system configuration of the femto cell to avoid collision with the one or more neighbor macro cells, and
   broadcasting, by the femto cell, the changed system configuration of the femto cell to a Mobile Station (MS),
   wherein changing the system configuration of the femto cell comprises:
   detecting received power of the DL signals and candidate cell IDs to which the DL signals correspond, respectively,
   selecting a cell ID corresponding to a DL signal which has a lowest received power, from among the candidate cell IDs, as a cell ID for the femto cell, and
   dynamically changing the cell ID of the femto cell to the selected cell ID.

2. The method according to claim 1, wherein the femto cell operates according to default configuration information in the stand-alone mode.

* * * * *